United States Patent [19]

Kawamura

[11] Patent Number: 5,687,413
[45] Date of Patent: Nov. 11, 1997

[54] CAMERA HAVING SHORT ENTIRE LENGTH

[75] Inventor: Kazuteru Kawamura, Tokyo, Japan

[73] Assignee: Olympus Optical Co., Ltd., Tokyo, Japan

[21] Appl. No.: 502,594

[22] Filed: Jul. 18, 1995

[30] Foreign Application Priority Data

Jul. 19, 1994 [JP] Japan .................. 6-166792

[51] Int. Cl.$^6$ .................. G03B 15/00; G03B 19/12
[52] U.S. Cl. .................. 396/351; 396/354
[58] Field of Search .................. 354/152, 195.12; 359/676, 687, 688, 689; 396/373, 385, 386, 351, 352, 354

[56] References Cited

U.S. PATENT DOCUMENTS

| | | | |
|---|---|---|---|
| 4,037,238 | 7/1977 | Leitz et al. | 354/152 |
| 4,655,571 | 4/1987 | Ohmura et al. | 354/150 |
| 4,861,145 | 8/1989 | Kikuchi | 350/427 |
| 4,949,107 | 8/1990 | Kitagishi et al. | |
| 5,227,919 | 7/1993 | Yano | 359/690 |
| 5,241,420 | 8/1993 | Yamanashi | 359/682 |
| 5,253,005 | 10/1993 | Koyama et al. | |
| 5,285,317 | 2/1994 | Uzawa | 359/676 |
| 5,309,284 | 5/1994 | Nakatsuji | 359/687 |
| 5,412,507 | 5/1995 | Sato | 359/687 |

FOREIGN PATENT DOCUMENTS 3-123329  5/1991  Japan .

*Primary Examiner*—Safet Metjahic
*Assistant Examiner*—John Chizmar
*Attorney, Agent, or Firm*—Cushman, Darby & Cushman IP Group of Pillsbury Madison & Sutro LLP

[57] ABSTRACT

A camera includes a photographing optical system in which at least one of a plurality of reflecting surfaces is disposed between a plurality of lenses and the optical path is bent by two reflecting surfaces including the at least one reflecting surface so that an image of an object falls on a film surface substantially facing the object; and an observing optical system of real image type in which one of the two reflecting surfaces is configured as a movable or path splitting surface to conduct light outside the photographing optical system so that the image of the object can be observed. Thus, the height as well as the entire length of the camera is reduced and compact design of the camera can be attained.

26 Claims, 17 Drawing Sheets

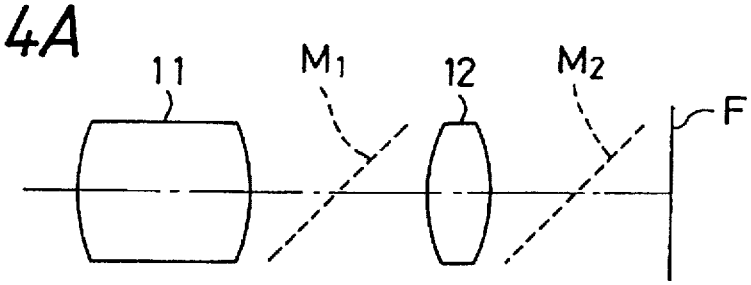
FIG. 4A
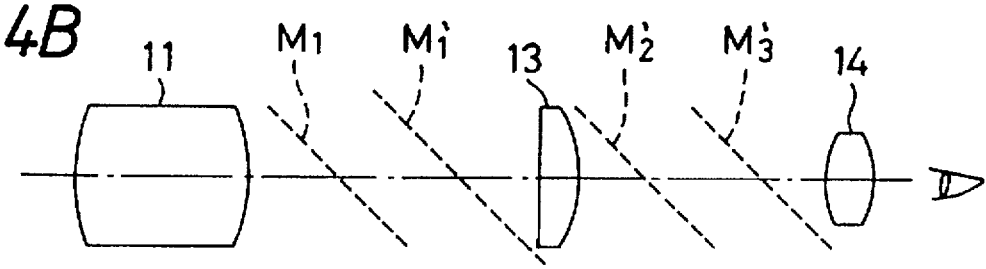
FIG. 4B
FIG. 5
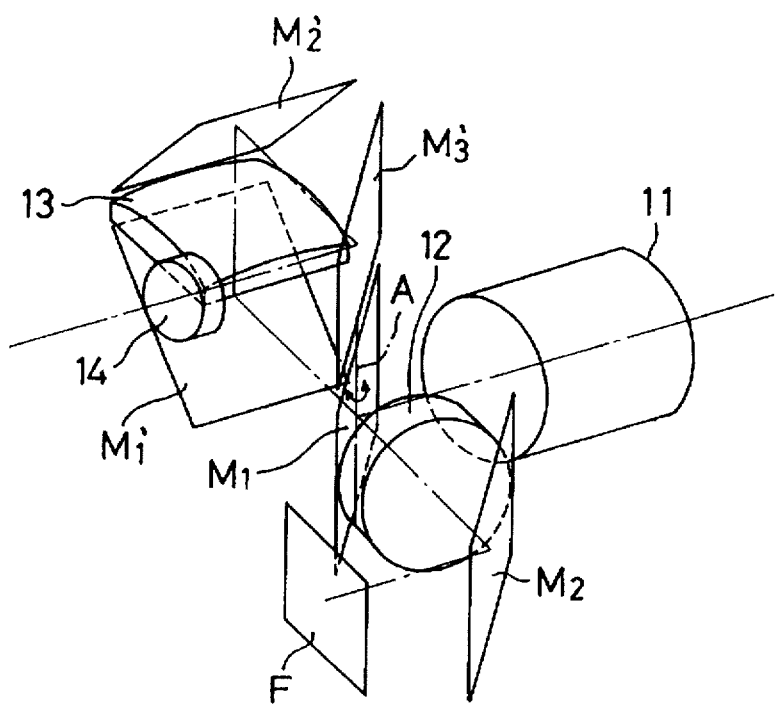

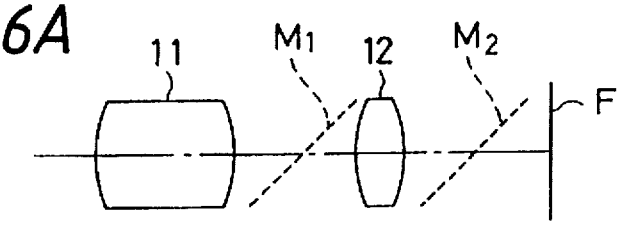
FIG. 6A
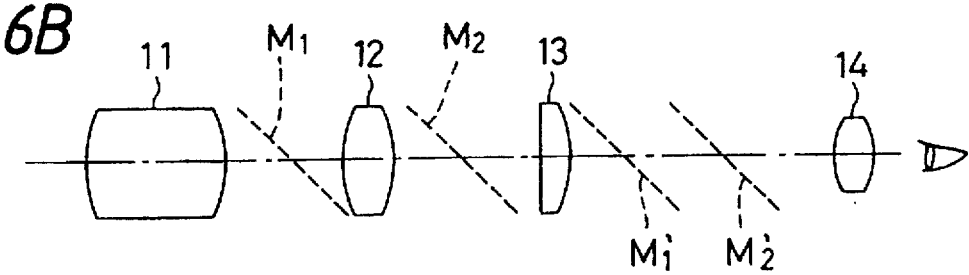
FIG. 6B
FIG. 7
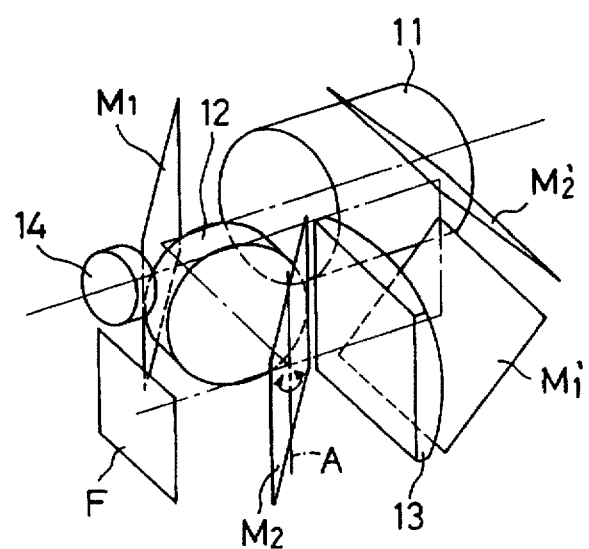

SPHERICAL ABERRATION
F.No=4.80

ASTIGMATISM
ω=32.05°

CHROMATIC ABERRATION OF MAGNIFICATION
ω=32.05°

DISTORTION
ω=32.05°

SPHERICAL ABERRATION
F.No=5.30

ASTIGMATISM
ω=16.35°

CHROMATIC ABERRATION OF MAGNIFICATION
ω=16.35°

DISTORTION
ω=16.35°

SPHERICAL ABERRATION
F.No=5.80

ASTIGMATISM
ω=8.15°

CHROMATIC ABERRATION OF MAGNIFICATION
ω=8.15°

DISTORTION
ω=8.15°

SPHERICAL ABERRATION
F.No=4.80

ASTIGMATISM
IM.H=10.73

CHROMATIC ABERRATION OF MAGNIFICATION
IM.H=10.73

DISTORTION
IM.H=10.73

SPHERICAL ABERRATION
F.No=5.64

ASTIGMATISM
IM. H=10.73

CHROMATIC ABERRATION OF MAGNIFICATION
IM. H=10.73

DISTORTION
IM. H=10.73

SPHERICAL ABERRATION
F.No=6.00

ASTIGMATISM
IM. H=10.73

CHROMATIC ABERRATION OF MAGNIFICATION
IM. H=10.73

DISTORTION
IM. H=10.73

SPHERICAL ABERRATION
NA=0.0010

ASTIGMATISM
IM.H=10.73

DISTORTION
IM.H=10.73

SPHERICAL ABERRATION
NA=0.0010

ASTIGMATISM
IM.H=14.60

DISTORTION
IM.H=14.60

SPHERICAL ABERRATION
F.No= 4.80

ASTIGMATISM
ω=32.05°

CHROMATIC ABERRATION OF MAGNIFICATION
ω=32.05°

DISTORTION
ω=32.05°

SPHERICAL ABERRATION
F.No= 5.30

ASTIGMATISM
ω=16.35°

CHROMATIC ABERRATION OF MAGNIFICATION
ω=16.35°

DISTORTION
ω=16.35°

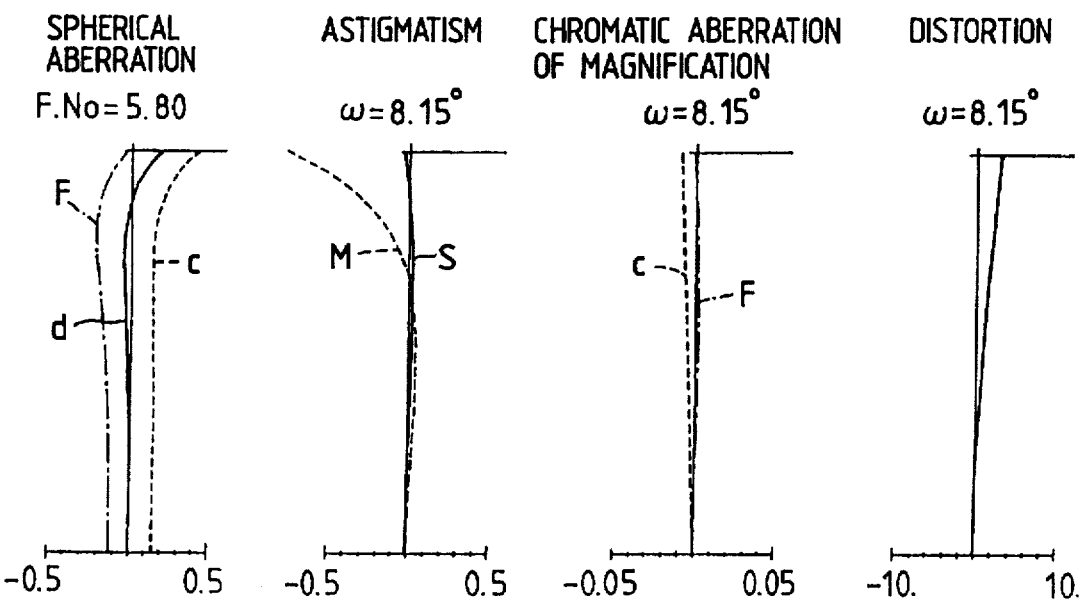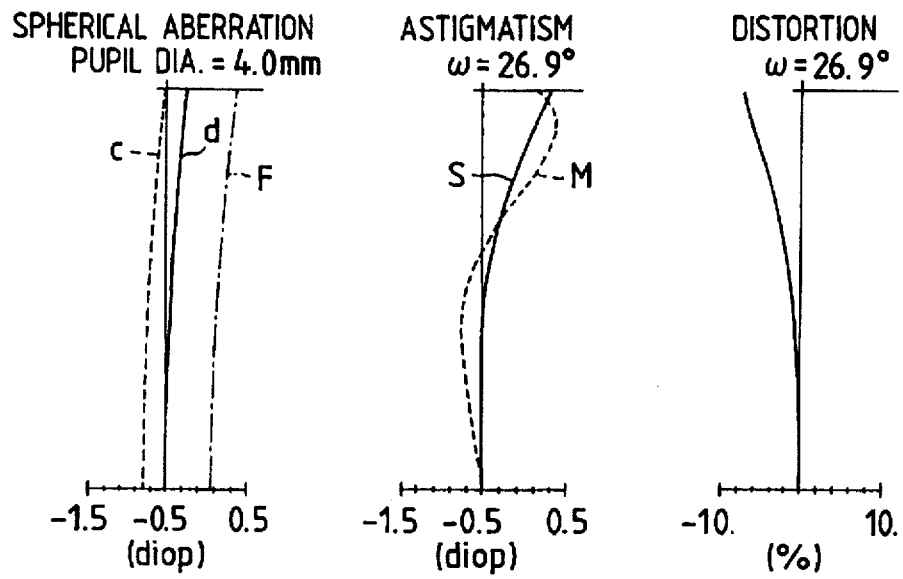

SPHERICAL ABERRATION
PUPIL DIA. = 4.0mm

ASTIGMATISM
ω = 26.9°

DISTORTION
ω = 26.9°

SPHERICAL ABERRATION
PUPIL DIA. = 4.0mm

ASTIGMATISM
ω = 26.9°

DISTORTION
ω = 26.9°

CAMERA HAVING SHORT ENTIRE LENGTH

BACKGROUND OF THE INVENTION

1. Field of the Invention

This invention relates to a TTL camera using a wide angle photographic lens or a zoom lens with a wide angle area.

2. Description of Related Art

A common TTL (through-the-lens) camera (a camera capable of observing an object through a photographic lens) has an optical arrangement such as that shown in FIG. 1. Specifically, an instant-return mirror M is disposed behind a photographic lens 1 so that when an object is photographed, the instant-return mirror M is turned upward (dotted lines in the figure) and an image of the object falls on a film surface F. When the object is observed, on the other hand, the instant-return mirror M is situated at an angle of nearly 45° between the photographic lens 1 and the film surface F so that light reflected upward from the instant-return mirror M forms the image on a condenser plate 2, and the image erected by a pentagonal roof prism 3 is observed through a Lupe 4.

In such a TTL camera, however, since the photographic lens 1, the instant-return mirror M, and the film surface F are arranged in a straight line along the optical axis and the pentagonal roof prism 3 is employed, there is a limit to reducing the entire length and height of the camera.

In order to solve this problem, various proposals have been made. As an example, an optical system set forth in U.S. Pat. No. 5,253,005 is designed to reduce the height of the camera. This optical system, as shown in FIG. 2, behind the photographic lens 1, has a first mirror M1 which is fixed to reflect a ray of light toward the right, looking against the object, and a second mirror M2 which is rotatable. When the object is photographed, the ray reflected toward the right by the first mirror M1 is reflected downward by the second mirror M2, and the object image falls on the film surface F. When the object is observed, on the other hand, the ray reflected toward the right by the first mirror M1 is reflected upward, opposite to the case of photography, by the second mirror M2 which is now turned, and forms the object image on the condenser plate 2. Subsequently, the optical path of the ray is bent leftward by a third mirror M3 and rearward by a fourth mirror M4 so that an erect image can be observed through the Lupe 4. To secure such an arrangement, the film surface F is placed perpendicular to the object.

Another example is a camera set forth in Japanese Patent Preliminary Publication No. Hei 3-123329 which is designed to reduce the entire length of the camera. The optical arrangement of this camera is shown in FIGS. 3A and 3B. In the camera, the first mirror M1 which is rotatable is disposed behind the photographic lens 1. In photography, a ray passing through the photographic lens 1 is obliquely reflected forward and upward by the first mirror M1 and further reflected rearward by the second mirror M2 so that the object image can be formed on the film surface F. In observing the object, the first mirror M1 is turned upward and a converter lens 6 is inserted in the optical path. In this way, the object image is observed through a relay finder system 7.

For the optical system set forth in U.S. Pat. No. 5,253,005 mentioned above (refer to FIG. 2), the film surface F is located at the position where the ray is reflected sideward and downward by the two reflecting surfaces M1 and M2, respectively. Consequently, the entire length of the camera along the optical axis can be reduced by a length nearly equal to the width of the film compared with the case where the reflecting surfaces are not used. Since, in the observation system, the erect image is brought about by the Lupe 4 (Porro prism), the height of the camera can be made lower than that of a camera in which the pentagonal roof prism is employed.

However, because the two reflecting surfaces M1 and M2 are arranged behind the photographic lens 1, it is necessary to increase the back focal length of the photographic lens 1. Thus, where a photographic lens with a wide angle area exceeding a photographic field angle of 55° is used, a strong retrofocus lens is required. This causes off-axis aberration because of asymmetry of the lens. The same holds for the case where a zoom lens with a wide angle area is used, and the degradation of optical performance of the photographic lens cannot be obviated. Moreover, since the film surface F is placed perpendicular to the photographing optical axis, the thickness of the camera body along the optical axis is limited by the length of a cartridge 5 and cannot be made smaller.

As for the camera set forth in Hei 3-123329 (refer to FIGS. 3A and 3B), the thickness along the optical axis can be smaller, but, similar to the optical system shown in FIG. 2, the two reflecting surfaces are arranged behind the photographic lens. Thus, where a wide angle photographic lens or a zoom lens with a wide angle area is used, remarkable deterioration of optical performance is caused for the same reason as in the optical system mentioned above.

SUMMARY OF THE INVENTION

It is, therefore, an object of the present invention to provide a camera in which the entire length along the optical axis and the height of the camera are reduced and even where a wide angle photographic lens or a zoom lens with a wide angle area is used, good optical performance can be maintained.

To achieve this object, the camera having a short entire length, according to the present invention, includes a photographing optical system which has a plurality of reflecting surfaces, at least one of which is disposed between a plurality of lenses, in the optical path (the optical path is bent by two reflecting surfaces which includes at least the above-mentioned one reflecting surface so that an image of an object falls on a film surface practically directed toward the object and an observing optical system of real image type in which one of the two reflecting surfaces is configured as a movable surface or path splitting surface to thereby conduct light outside the photographing optical system so that the object image can be observed.

Further, the photographing optical system of the camera according to the present invention is constructed with a zoom photographing optical system comprising, in order from the object side, a first lens unit with a positive refracting power, a second lens unit with a negative refracting power, a third lens unit with a positive refracting power, a fourth lens unit with a positive refracting power, and a fifth lens unit with a negative refracting power. The optical path of the photographing optical system is bent by two of a plurality of reflecting surfaces arranged in the optical path.

Still further, a lens configuration combining the third and fourth lens units includes, in order from the object side, a positive lens, a negative lens, and a positive lens.

According to the present invention, therefore, it is possible to reduce the entire length along the optical axis of the camera and lower the height thereof, without the smallest strain. Moreover, even when a wide angle photographic lens or a zoom lens with a wide angle area is used, the optical performance of the photographic lens can be favorably maintained.

In the present invention, it is desirable that an angle θ made by the film surface with the optical axis of incident light on the photographic lens satisfies the condition:

|θ|<30°  (1)

If the value of |θ| exceeds 30°, a sufficient effect for compactness of a camera will not be achieved, which is unfavorable.

This and other objects as well as the features and advantages of the present invention will become apparent from the following detailed description of the preferred embodiments when taken in conjunction with the accompanying drawings.

BRIEF DESCRIPTION OF THE DRAWINGS

FIG. 4A is a schematic view showing the arrangement, developed along the optical axis, of a photographing optical system used in a first embodiment of a camera according to the present invention;

FIG. 4B is a schematic view showing the arrangement, developed along the optical axis, of an observing optical system used in the first embodiment;

FIG. 5 is a view showing the optical arrangement of the camera mounting the optical systems of FIGS. 4A and 4B;

FIG. 6A is a schematic view showing the arrangement, developed along the optical axis, of a photographing optical system used in a second embodiment of the camera according to the present invention;

FIG. 6B is a schematic view showing the arrangement, developed along the optical axis, of an observing optical system used in the second embodiment;

FIG. 7 is a view showing the optical arrangement of the camera mounting the optical systems of FIGS. 6A and 6B;

FIGS. 25A, 25B, 25C, and 25D are diagrams showing characteristics of spherical aberration, astigmatism, chromatic aberration of magnification, and distortion, respectively, at the high magnification position of the photographing optical system of FIG. 21C;

FIGS. 26A, 26B, and 26C are diagrams showing characteristics of spherical aberration, astigmatism, and distortion, respectively, at the low magnification position of the objective system of the observing optical system of FIG. 22A;

DETAILED DESCRIPTION OF THE PREFERRED EMBODIMENTS

Figure 1:
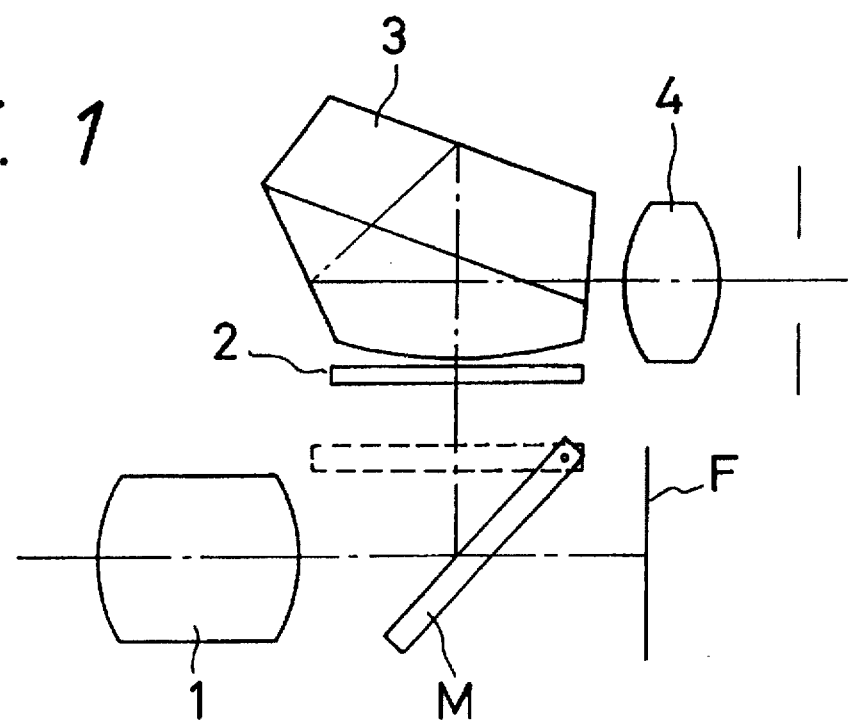
FIG. 1 is a view showing the optical arrangement of a common TTL camera.
Figure 2:
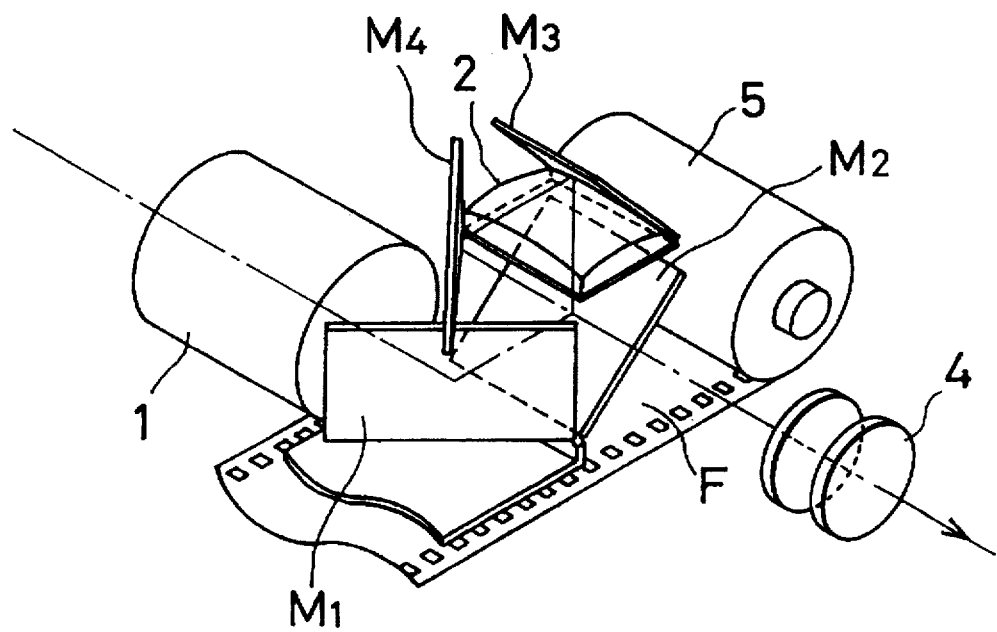
FIG. 2 is a view showing an example of the optical arrangement of a conventional TTL camera.
Figure 3A:
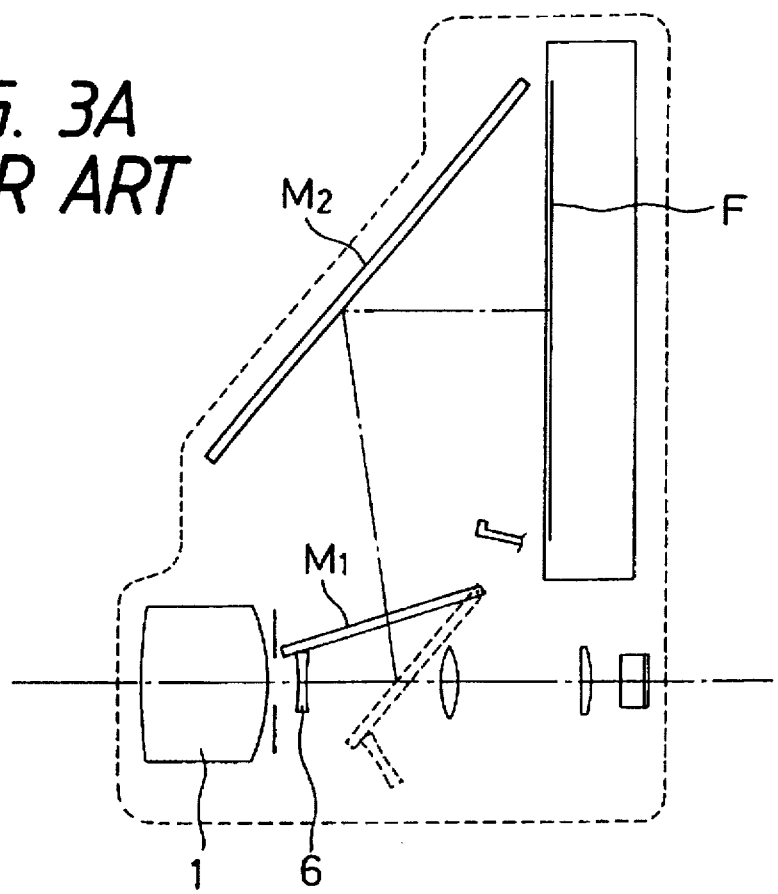
FIG. 3A is a plan view showing another example of the optical arrangement of the conventional TTL camera.
Figure 3B:
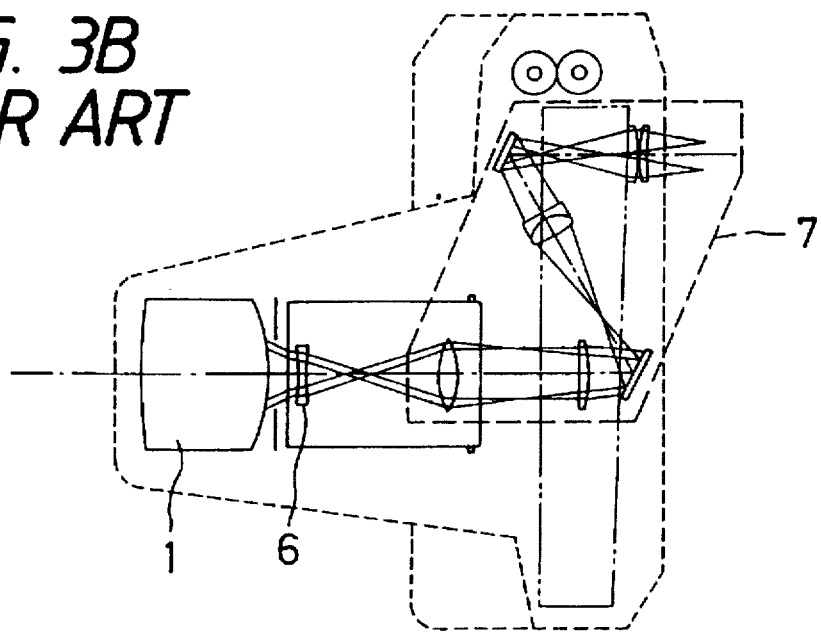
FIG. 3B is a side view showing the arrangement of FIG. 3A.

In accordance with the embodiments shown in the drawings, the present invention will be explained in detail below.

FIRST EMBODIMENT

A photographing optical system used in the camera of this embodiment, as shown in FIG. 4A, is designed to include, in order from the object side, a first lens system 11, a first mirror M1, a second lens system 12, a second mirror M2 for a photographic system, and a film surface F. The first mirror M1 is situated between the first and second lens systems 11 and 12 constituting a photographic lens system, and the second mirror M2 is disposed behind the second lens system 12.

On the other hand, an observing optical system, as shown in FIG. 4B, includes, in order from the object side, the first lens system 11, the first mirror M1, a first mirror M1' for an observing system, a field lens 13, a second mirror M2' for the observing system, a third mirror M3' for the observing system, and a Lupe 14, and is constructed as a real image mode finder in which a real image is formed adjacent to the field lens 13.

Here, the first lens system 11 is used in both the photographing and observing optical systems. The first mirror M1 is designed so that an optical path can be changed over by its rotation, and thus optical paths subsequent to the first mirror M1 (the right of the first mirror M1 in FIGS. 4A and 4B) are formed so that the optical path of the photographing optical system is independent of that of the observing optical system.

The optical arrangement of the camera mounting the photographing and observing optical systems is illustrated in FIG. 5. A ray of light transmitted through the first lens system 11 reaches the first mirror M1, which is supported, close to its center, by a longitudinal axis member A and can be rotated about it. By rotating the first mirror M1, the optical path can be switched over to the right or left, looking against the object.

The photographing optical system is constructed so that its optical path is directed toward the right, looking against the object, by the first mirror M1, and after going through the second lens system 12, is bent backward by the second mirror M2 for the photographic system which is fixed, reaching the film surface F.

On the other hand, the observing optical system is such that its optical path is bent in a direction opposite to the photographing optical system by the first mirror M1, and upward by the first mirror M1' for the observing system to form the image of the object adjacent to the field lens 13.

The image transmitted by the field lens 13 is such that its optical path is bent rightward by the second mirror M2' for the observing system and backward by the third mirror M3' for the observing system, and observation can be made through the Lupe 14.

In the first embodiment, the optical path of the photographing optical system is bent sideward at the rear of the first lens system 11 and backward at the rear of the second lens system 12, thereby allowing the entire length of the camera along the optical axis to be reduced. For the observing optical system, which uses a Porro mirror instead of a pentagonal roof prism, the height of the camera can be kept to a minimum. Moreover, the thickness of the camera body along the optical axis can be made smaller.

Since the photographing optical system is designed so that one reflection occurs between the lenses constituting the photographic lens system and another reflection is caused behind the photographic lens system, the back focal length need not be increased, and even when a wide angle photographic lens and a zoom lens with a wide angle area are used, lenses can readily be arranged to maintain the optical performance of the lens system.

In general, where a zoom lens with a high variable magnification ratio is used in the photographic lens system to decrease the thickness of the camera body along the optical axis, the photographic lens system will largely protrude forward from the camera body. Thus, the strength of a portion holding the lens system must be increased, with a resulting large-sized camera. In the first embodiment, however, the forward protrusion of the photographic lens system can be suppressed to a minimum, which situation is very advantageous to the compactness of the camera.

SECOND EMBODIMENT

The photographing optical system used in the camera of this embodiment, as shown in FIG. 6A, includes, in order from the object side, the first lens system 11, the first mirror M1, the second lens system 12, the second mirror M2, and the film surface F. The first mirror M1 is interposed between the first and second lens systems 11 and 12 constituting the photographic lens system, and the second mirror M2 is disposed behind the second lens system 12.

On the other hand, the observing optical system, as shown in FIG. 6B, includes, in order from the object side, the first lens system 11, the first mirror M1, the second lens system 12, the second mirror M2, the field lens 13, the first mirror M1' for the observing system, the second mirror M2' for the observing system, and the Lupe 14, and is constructed as a real image mode finder in which a real image is formed adjacent to the field lens 13.

Here, the first lens system 11, the first mirror M1, the second lens system 12, and the second mirror M2 are used in both the photographing and observing optical systems. The second mirror M2 is designed to change over an optical path by its rotation, and thus optical paths subsequent to the first mirror M1 (the right of the first mirror M1 in FIGS. 6A and 6B) are formed so that the optical path of the photographing optical system is independent of that of the observing optical system.

The optical arrangement of the camera mounting the photographing and observing optical systems is illustrated in FIG. 7. A ray of light transmitted through the first lens system 11 is bent by the first mirror M1 to the right, looking against the object, and after passing through the second lens system 12, reaches the second mirror M2, which is supported, close to its center, by the longitudinal axis member A and can be rotated about it. By rotating the second mirror M2, the optical path can be switched over to the front or rear, looking against the object.

The photographing optical system is constructed so that its optical path is bent to the right, looking against the object, by the second mirror M2 and reaches the film surface F.

The observing optical system, on the other hand, is such that Its optical path is bent in a direction opposite to the photographing optical system by the second mirror M2 and the object image is formed close to the field lens 13. The image transmitted by the field lens 13 is such that its optical path is bent upward by the first mirror M1' for the observing system and backward by the second mirror M2' for the observing system, and observation can be made through the Lupe 14. The four mirrors (M1, M2, M1', and M2') of the observing optical system constitute a Porro prism, through which the erect image of the object can be observed.

The camera of the second embodiment, which is constructed mentioned above, has the same features as in the first embodiment.

THIRD EMBODIMENT

Figure 8A:
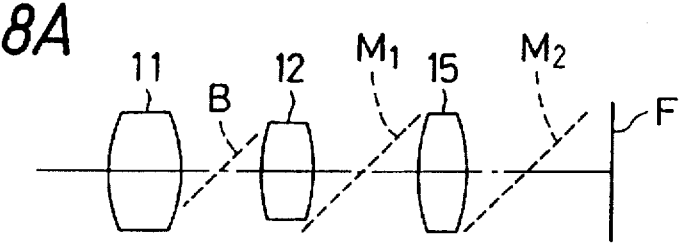
FIG. 8A is a schematic view showing the arrangement, developed along the optical axis, of a photographing optical system used in a third embodiment of the camera according to the present invention.

The photographing optical system used in the camera of this embodiment, as shown in FIG. 8A, includes, in order from the object side, the first lens system 11, a beam splitter B, the second lens system 12, the first mirror M1 for the photographic system, a third lens system 15, the second mirror M2, and the film surface F. The first mirror M1 is placed between the second and third lens systems 12 and 15 constituting the photographic lens system, and the second mirror M2 is disposed behind the third lens system 15.

Figure 8B:
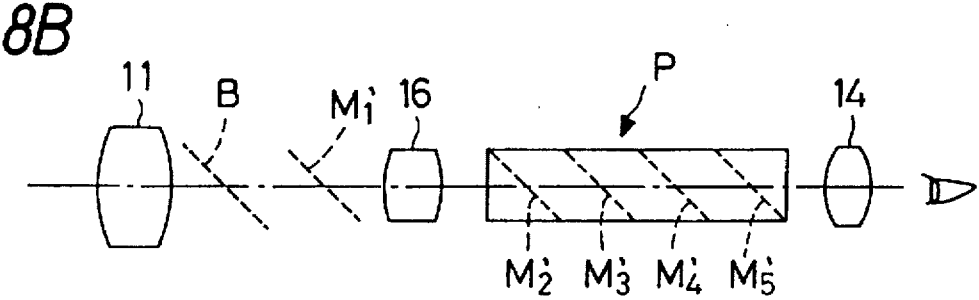
FIG. 8B is a schematic view showing the arrangement, developed along the optical axis, of an observing optical system used in the third embodiment.

On the other hand, the observing optical system, as shown in FIG. 8B, comprises, in order from the object side, the first lens system 11, the beam splitter B, the first mirror M1' for the observing system, a second lens system 16 for the observing system, a prism P, and the Lupe 14, and is constructed as a real image mode finder in which a real image is formed close to the prism P. The prism P is a Porro prism containing the four reflecting surfaces: the second mirror M2', the third mirror M3', a fourth mirror M4', and a fifth mirror M5' for the observing system, and is designed so that the object image can be observed.

Here, the first lens system 11 is used in both the photographing and observing optical systems. The beam splitter B transmits and reflects light to split the amount thereof, and conducts transmitted light to the photographing optical system and reflected light to the observing optical system to form split optical paths. In this way, optical paths subsequent to the beam splitter B (the right of the beam splitter B in FIGS. 8A and 8B) are formed so that the optical path of the photographing optical system is independent of that of the observing optical system.

Figure 9:
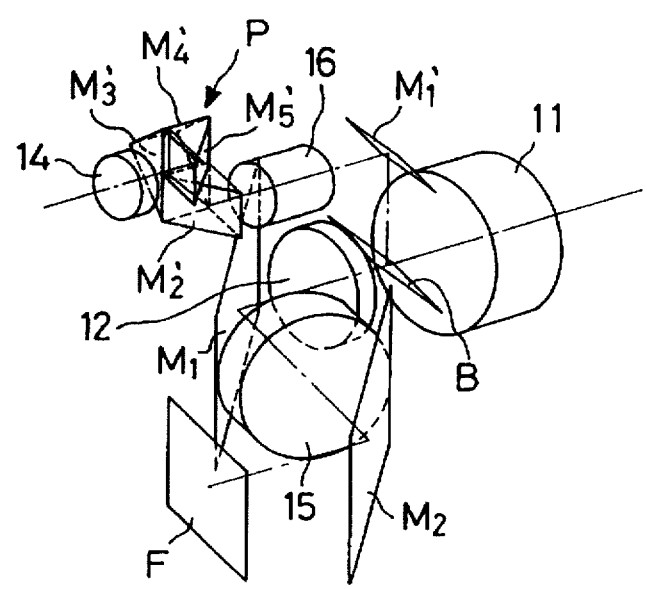
FIG. 9 is a view showing the optical arrangement of the camera mounting the optical systems of FIGS. 8A and 8B.

The optical arrangement of the camera mounting the photographing and observing optical systems is shown in FIG. 9. The path of a ray of light transmitted through the first lens system 11 is split by the beam splitter B toward the photographing and observing optical systems.

In the photographing optical system, the ray transmitted through the beam splitter B and the second lens system 12 is turned to the right, looking against the object, by the first mirror M1. Subsequently, the ray transmitted through the third lens system 15 is bent backward by the second mirror M2 and arrives at the film surface F.

In the observing optical system, on the other hand, the ray is reflected and bent upward by the beam splitter B. After that, the ray is bent backward by the first mirror M1', and after being transmitted through the second lens system 16, forms the object image adjacent to the surface of the prism P on which light is incident. The optical path of the image, after entering the prism P, is directed toward the left, looking against the object, by the second mirror M2', and is bent upward by the third mirror M3'. Subsequently, the optical path is bent to the right by the fourth mirror M4' and finally is bent backward by the fifth mirror M5', emerging from the prism P. Then, the object image is observed through the Lupe 14.

The focal length of the second lens system 16 for the observing system is set so that the combined focal length of the first lens system 11 and the second lens system 16 is smaller than the focal length of the photographing optical system. Thus, the size of an intermediate image of the observing optical system is made smaller than that of the film.

In the third embodiment, the optical path of the photographing optical system is bent sideward at the rear of the second lens system 12 and backward at the rear of the third lens system 15, thereby allowing the entire length of the camera along the optical axis to be reduced. Furthermore, the thickness of the camera body along the optical axis can be made small. Since the focal length of the second lens system 16 for the observing system is set so that the size of the intermediate image of the observing optical system is made smaller than that of the film, the prism P can be made compact. In this way, the height of the camera is reduced, and thus compact design of the camera can be realized.

In general, even when a zoom lens with a high variable magnification ratio is used in the photographic lens system to reduce the thickness of the camera body along the optical axis, the third embodiment has the same advantages as the first embodiment.

FOURTH EMBODIMENT

The camera of this embodiment is such that the photographing and observing optical systems of the camera disclosed in the first embodiment are constructed with zoom lenses, respectively.

Figure 10A:
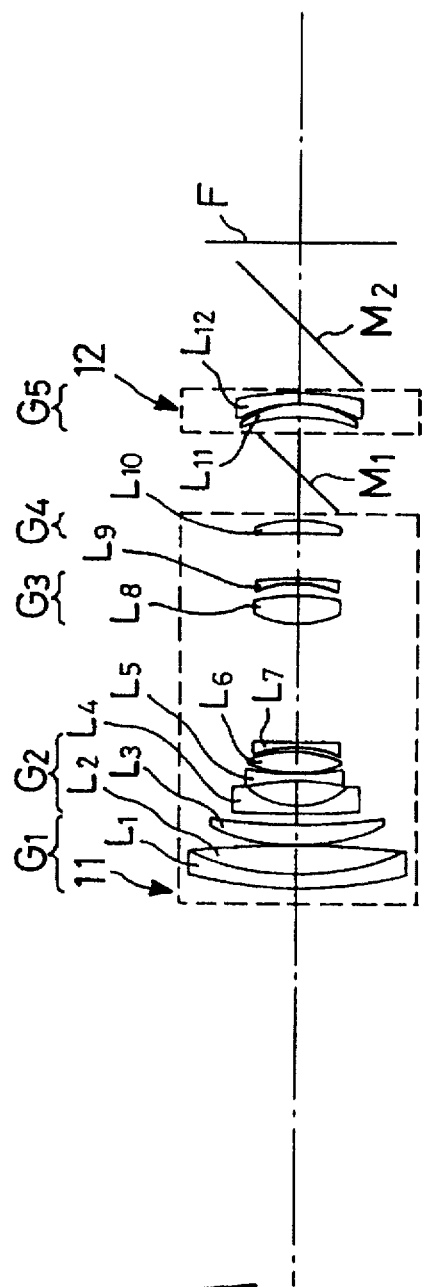
FIGS. 10A, 10B, and 10C are views showing the arrangements, developed along the optical axis, at low, moderate, and high magnification positions, respectively, of a photographing optical system used in a fourth embodiment of the camera according to the present invention.
Figure 10B:
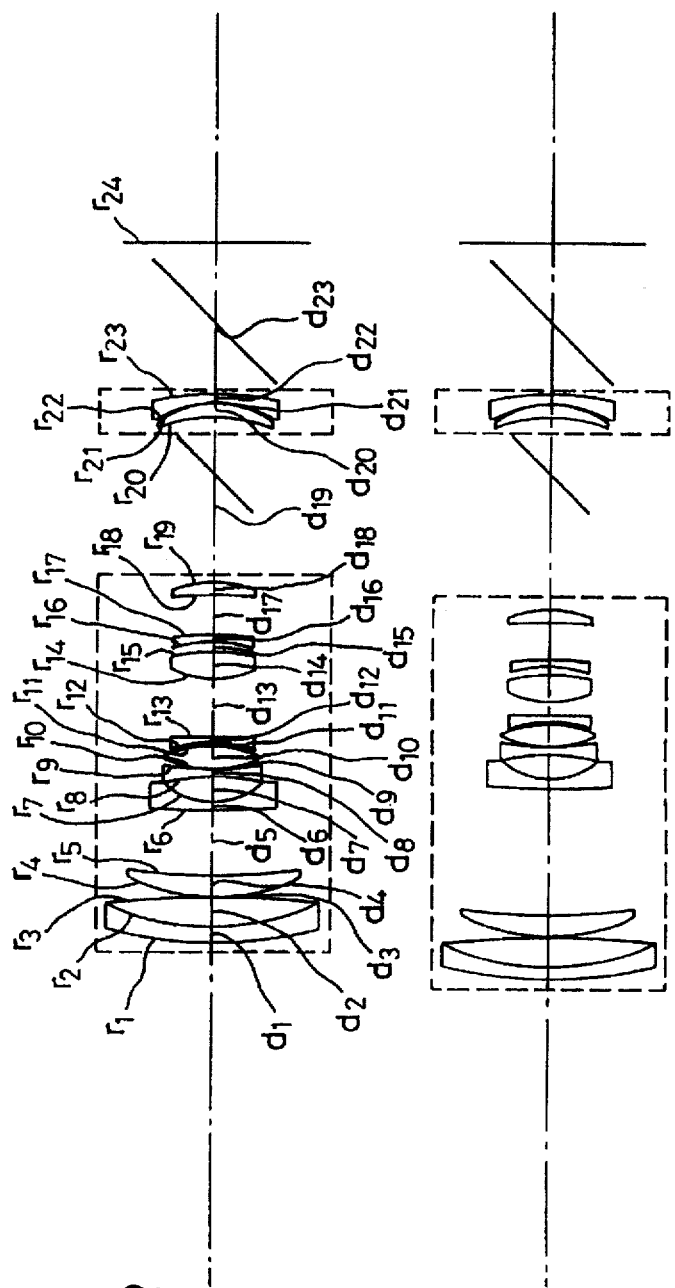
Figure 10C:
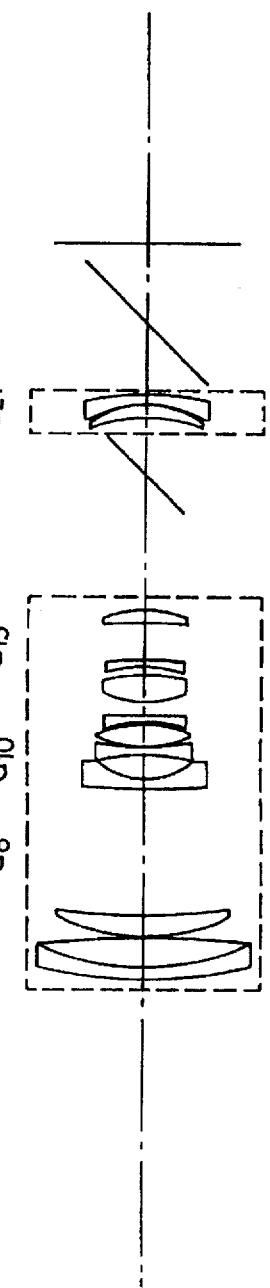

In the photographing optical system used in the camera of the fourth embodiment, as shown in FIG. 10A–10C, the first lens system 11 comprises, in order from the object side, a first lens unit G1, a second lens unit G2, a third lens unit G3, and a fourth lens unit G4. The second lens system 12 is composed of a fifth lens unit G5 alone. The first lens unit G1 includes a cemented lens component with a negative lens L1 and a positive lens L2, and a positive lens L3, which have a positive refracting power as a whole. The second lens unit G2 includes a negative lens L4, a negative lens L5, a positive lens L6, and a negative lens L7, which have a negative refracting power as a whole. The third lens unit G3 includes a positive lens L8 and a negative lens L9, which have a positive refracting power as a whole. The fourth lens unit G4 includes a positive lens L10. Finally, the fifth lens unit G5 includes a positive lens L11 and a negative lens L12, which have a negative refracting power as a whole.

When the magnification of the photographing optical system is changed from the low magnification position to the high magnification position, the first, third, and fourth lens units G1, G3, and G4 are moved toward the object (the left of the figures), and the second lens unit G2 is moved toward the image (the right). In this case, the arrangement is such that the first to fourth lens units G1–G4 move independently of one another. The fifth lens unit G5 is fixed.

In this photographing optical system also, the first mirror M1 is interposed between the first and second lens systems 11 and 12, and the second mirror M2 is disposed behind the second lens system 12. Thus, the photographing optical system includes, in order from the object side, the first lens system 11, the first mirror M1, the second lens system 12, the second mirror M2, and the film surface F. The first and second mirrors M1 and M2 remain fixed during the zooming of the photographing optical system.

Figure 11A:
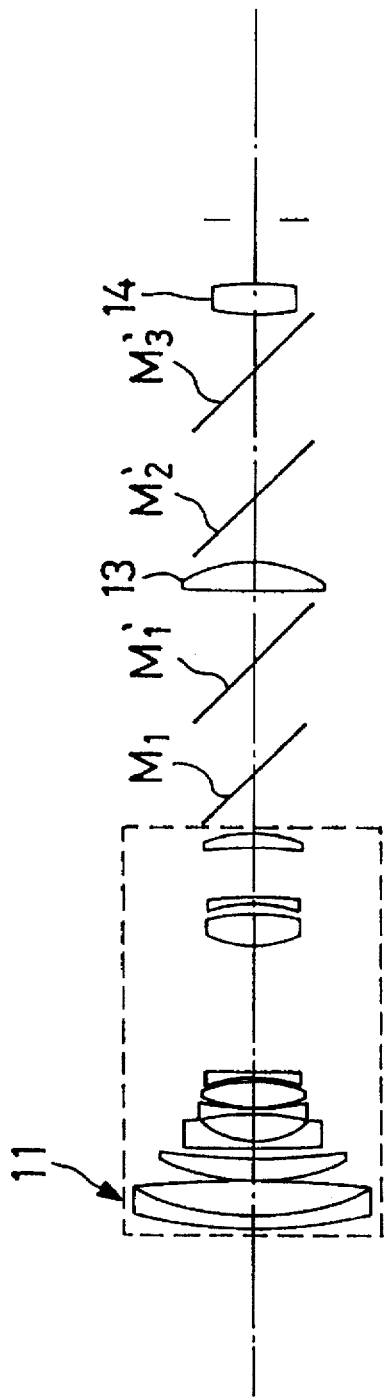
FIGS. 11A, 11B, and 11C are views showing the arrangements, developed along the optical axis, at low, moderate, and high magnification positions, respectively, of an observing optical system used in the fourth embodiment.
Figure 11B:
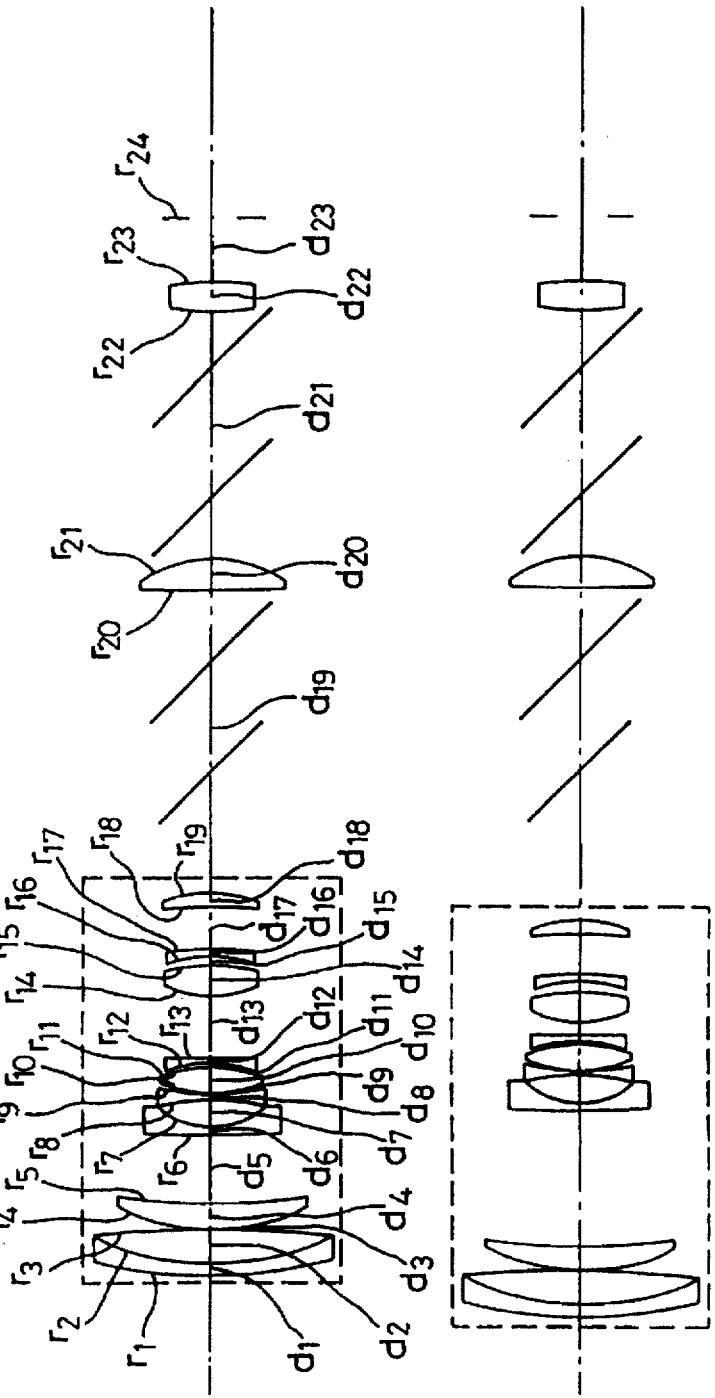
Figure 11C:
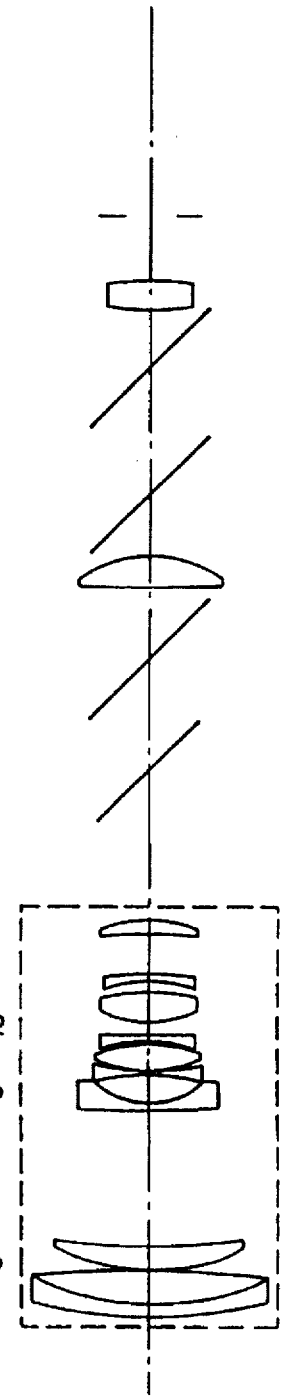
Figure 12A:
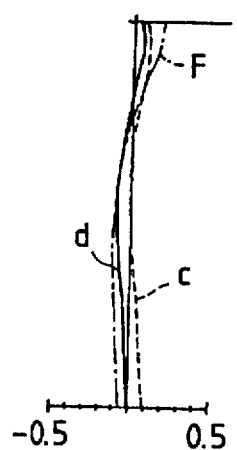
FIGS. 12A, 12B, 12C, and 12D are diagrams showing characteristics of spherical aberration, astigmatism, chromatic aberration of magnification, and distortion, respectively, at the low magnification position of the photographing optical system of FIG. 10A.
Figure 12B:
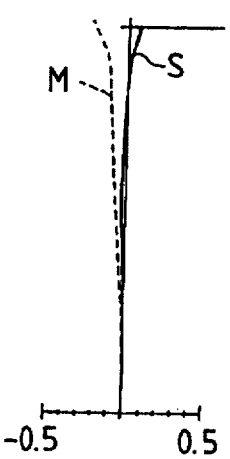
Figure 12C:
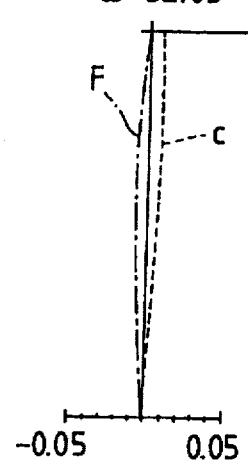
Figure 12D:
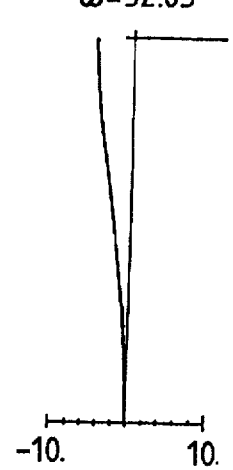
Figure 13A:
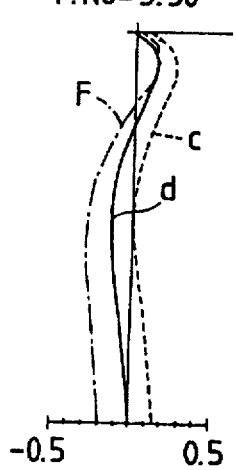
FIGS. 13A, 13B, 13C, and 13D are diagrams showing characteristics of spherical aberration, astigmatism, chromatic aberration of magnification, and distortion, respectively, at the moderate magnification position of the photographing optical system of FIG. 10B.
Figure 13B:
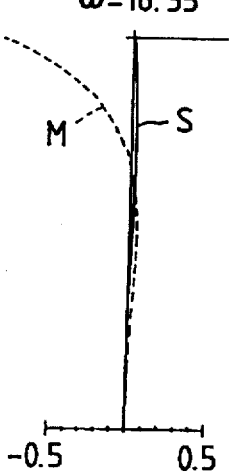
Figure 13C:
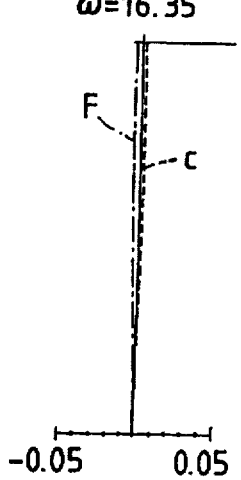
Figure 13D:
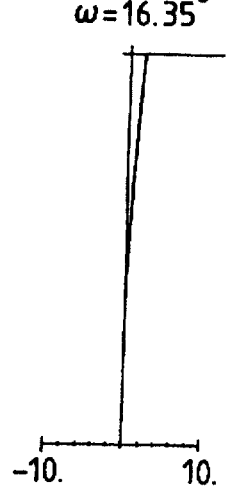
Figure 14A:
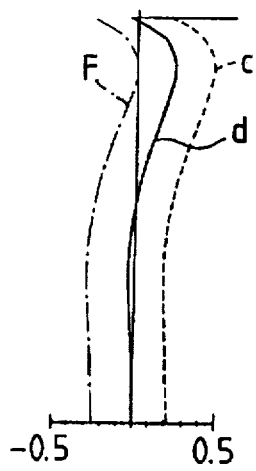
FIGS. 14A, 14B, 14C, and 14D are diagrams showing characteristics of spherical aberration, astigmatism, chromatic aberration of magnification, and distortion, respectively, at the high magnification position of the photographing optical system of FIG. 10C.
Figure 14B:
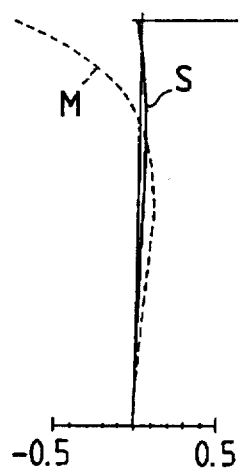
Figure 14C:
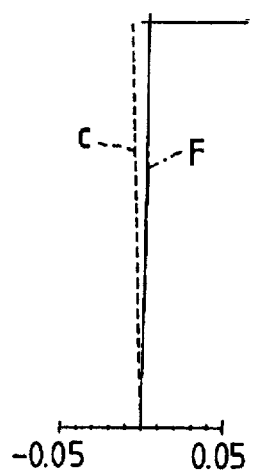
Figure 14D:
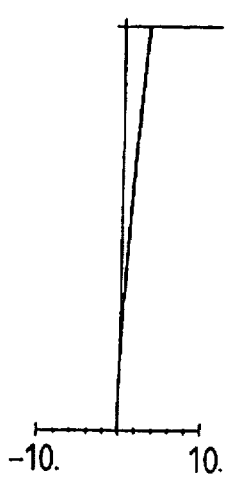
Figure 15A:
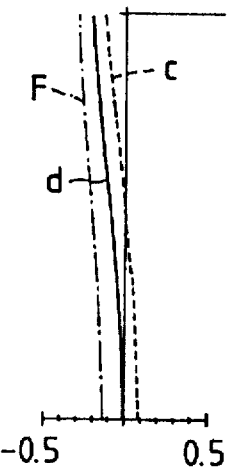
FIGS. 15A, 15B, 15C, and 15D are diagrams showing characteristics of spherical aberration, astigmatism, chromatic aberration of magnification, and distortion, respectively, at the low magnification position of the objective system of the observing optical system of FIG. 11A.
Figure 15B:
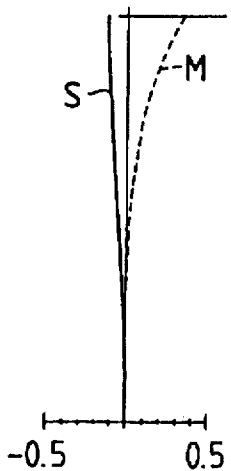
Figure 15C:
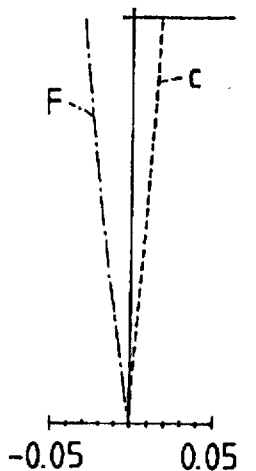
Figure 15D:
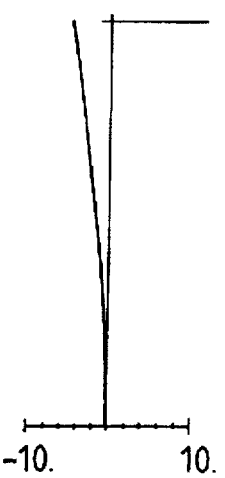
Figure 16A:
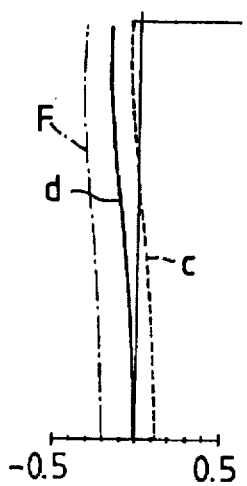
FIGS. 16A, 16B, 16C, and 16D are diagrams showing characteristics of spherical aberration, astigmatism, chromatic aberration of magnification, and distortion, respectively, at the moderate magnification position of the objective system of the observing optical system of FIG. 11B.
Figure 16B:
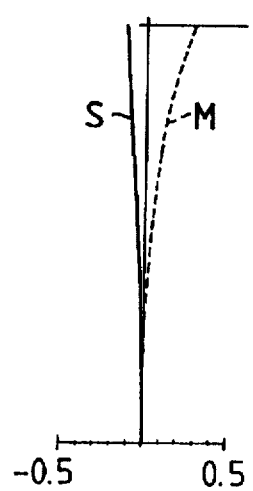
Figure 16C:
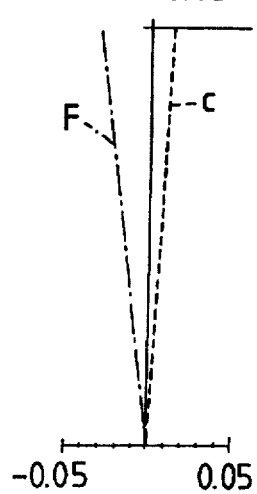
Figure 16D:
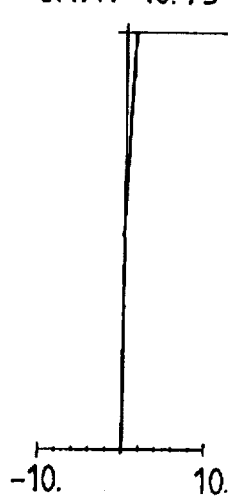
Figure 17A:
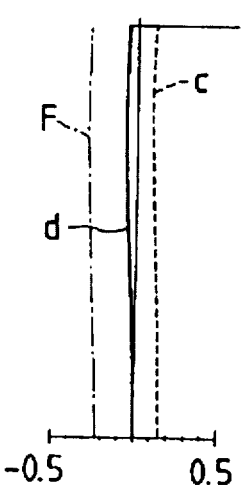
FIGS. 17A, 17B, 17C, and 17D are diagrams showing characteristics of spherical aberration, astigmatism, chromatic aberration of magnification, and distortion, respectively, at the high magnification position of the objective system of the observing optical system of FIG. 11C.
Figure 17B:
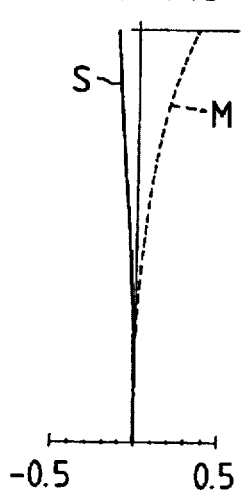
Figure 17C:
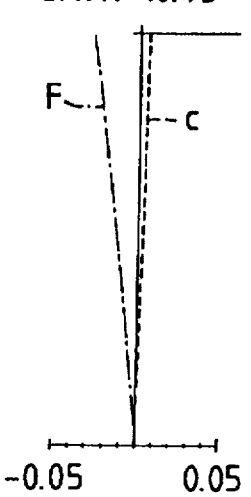
Figure 17D:
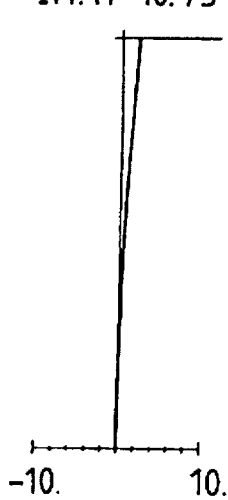

The observing optical system, as shown in FIGS. 11A–11C, includes, in order from the object side, the first lens system 11 composed of the first to fourth lens units G1–G4 which is also used in the photographing optical system, the first mirror M1, the first mirror M1' for the observing system, the field lens (positive lens) 13, the second mirror M2' for the observing system, the third mirror M3' for the observing system, and the Lupe 14. The surface of the field lens 13 on which light is incident is covered with a screen mat, on which the object image is formed, so that the object image can be observed through the Lupe 14. The first mirror M1, the first mirror M1', the field lens 13, the second mirror M2', the third mirror M3', and the Lupe 14 remain fixed during the zooming. The first mirror M1 is such that the optical path can be changed over by its rotation, and thus optical paths subsequent to the first mirror M1 are formed so that the optical path of the photographing optical system is independent of that of the observing optical system.

The third and fourth lens units G3 and G4 of the first lens system 11, which are particular places where rays of light concentrate, are exceedingly subject to spherical aberration and coma. In the fourth embodiment, therefore, the third lens unit G3 of the first lens system 11 is constructed with two lenses, and the fourth lens unit G4 with a single lens, so that the number of lenses used is lessened. Furthermore, the third and fourth lens units G3 and G4 are combined so that, in order from the object side, a positive lens, a negative lens, and a positive lens are arranged. The surface of at least one of these lenses is made aspherical, and thereby spherical aberration and coma can be favorably corrected even with a small number of lenses. Also, such an arrangement gives sufficient space for the placement of the first mirror M1.

Calling f34 the combined focal length of the third and fourth lens units G3 and G4 at the low magnification position, FNO the F-number of the photographing optical system at the low magnification position, and D34 the combined optical length of the third and fourth lens units G3 and G4 at the low magnification position, it is desirable to satisfy the condition:

$$0.1 < f34/(FNO \times D34) < 0.8 \qquad (2)$$

Eq. (2) shows the ratio of the effective diameters of the third and fourth lens units G3 and G4 at the low magnification position to the combined optical length of the third and fourth lens units G3 and G4. If the value of Eq. (2) exceeds the Upper limit, the balance between spherical aberration and coma will be destroyed and correction becomes difficult. If it is below the lower limit, it becomes difficult to reduce the entire length of the optical system and secure sufficient space for the placement of the first mirror M1.

By using the lenses with a negative refracting power in the fifth lens unit G5 constituting the second lens system 12, the size of the intermediate image in the observing optical system can be made smaller than that of the film. In this way, the size of the observing optical system is diminished, and the compactness of the camera can be attained.

In the fourth embodiment, when the field factor of the finder is set to 85%, the size of the intermediate image is about 0.6 times that of the film.

The numerical data of lenses in the optical system of the fourth embodiment is shown below.

[Photographing optical system]

Focal length = 28.8 (low magnification position), 57.9 (moderate magnification position), 116.3 (high magnification position)
Field angle (2ω) = 64.1° (low), 32.5° (moderate), 16.3° (high)
F-number = 4.8 (low), 5.3 (moderate), 5.8 (high)

$r_1 = 85.4456$
$d_1 = 1.950 \qquad n_1 = 1.80518 \qquad v_1 = 25.43$
$r_2 = 43.4196$
$d_2 = 5.500 \qquad n_2 = 1.54771 \qquad v_2 = 62.83$
$r_3 = -213.7532$
$d_3 = 0.100$
$r_4 = 31.3075$
$d_4 = 4.000 \qquad n_4 = 1.48749 \qquad v_4 = 70.20$
$r_5 = 122.1096$
$d_5 = 1.4321$ (low), 11.5122 (moderate), 22.4004 (high)
$r_6 = 175.9715$
$d_6 = 1.500 \qquad n_6 = 1.81600 \qquad v_6 = 46.62$
$r_7 = 13.3064$
$d_7 = 4.200$
$r_8 = -41.8832$
$d_8 = 1.200 \qquad n_8 = 1.74100 \qquad v_8 = 52.68$
$r_9 = 39.6186$
$d_9 = 0.200$
$r_{10} = 22.5832$
$d_{10} = 4.000 \qquad n_{10} = 1.74077 \qquad v_{10} = 27.79$
$r_{11} = -25.9380$
$d_{11} = 0.821$
$r_{12} = -20.5061$
$d_{12} = 1.100 \qquad n_{12} = 1.77250 \qquad v_{12} = 49.66$
$r_{13} = -1236.8753$
$d_{13} = 21.3690$ (low), 10.6785 (moderate), 2.4752 (high) (aspherical)
$r_{14} = 17.4722$
$d_{14} = 4.955 \qquad n_{14} = 1.55963 \qquad v_{14} = 61.17$
$r_{15} = -29.1089$
$d_{15} = 1.400$
$r_{16} = -20.1868$
$d_{16} = 1.200 \qquad n_{16} = 1.78472 \qquad v_{16} = 25.68$
$r_{17} = -78.2748$
$d_{17} = 7.9972$ (low), 6.6835 (moderate), 6.3593 (high) (aspherical)
$r_{18} = -865.7039$
$d_{18} = 2.342 \qquad n_{18} = 1.48749 \qquad v_{18} = 70.20$
$r_{19} = -22.1048$
$d_{19} = 18.7033$ (low), 29.3543 (moderate), 33.8205 (high)
$r_{20} = -28.8007$
$d_{20} = 2.700 \qquad n_{20} = 1.53172 \qquad v_{20} = 48.90$
$r_{21} = -16.6629$
$d_{21} = 0.299$
$r_{22} = -18.3409$
$d_{22} = 1.499 \qquad n_{22} = 1.80400 \qquad v_{22} = 46.57$
$r_{23} = -44.2389$
$d_{23} = 26.992$
$r_{24}$ (film surface)

Aspherical coefficients
Fourteenth surface $P = 2.5687$
$E = -0.39066 \times 10^{-4}, F = -0.22909 \times 10^{-6},$
$G = -0.92040 \times 10^{-10}, H = -0.12108 \times 10^{-10}$ -continued

[Photographing optical system]

| | |
|---|---|
| Focal length = | 28.8 (low magnification position), 57.9 (moderate magnification position), 116.3 (high magnification position) |
| Field angle (2ω) = | 64.1° (low), 32.5° (moderate), 16.3° (high) |
| F-number = | 4.8 (low), 5.3 (moderate), 5.8 (high) |

Eighteenth surface

P = 6.5404
E = −0.50437 × $10^{-4}$, F = −0.12402 × $10^{-6}$,
G = −0.25021 × $10^{-9}$, H = −0.68127 × $10^{-11}$

In the photographing optical system of the fourth embodiment, the result of Eq. (2) is as follows:

$$f34/(FNO \times D34)=0.309$$

[Observing optical system]

(Objective system)

| | | | |
|---|---|---|---|
| $r_1$ = 85.4456 | | | |
| | $d_1$ = 1.950 | $n_1$ = 1.80518 | $v_1$ = 25.43 |
| $r_2$ = 43.4196 | | | |
| | $d_2$ = 5.500 | $n_2$ = 1.54771 | $v_2$ = 62.83 |
| $r_3$ = −213.7532 | | | |
| | $d_3$ = 0.100 | | |
| $r_4$ = 31.3075 | | | |
| | $d_4$ = 4.000 | $n_4$ = 1.48749 | $v_4$ = 70.20 |
| $r_5$ = 122.1096 | | | |
| | $d_5$ = 1.4321 (low), 11.5122 (moderate), 22.4004 (high) | | |
| $r_6$ = 175.9715 | | | |
| | $d_6$ = 1.500 | $n_6$ = 1.81600 | $v_6$ = 46.62 |
| $r_7$ = 13.3064 | | | |
| | $d_7$ = 4.200 | | |
| $r_8$ = −41.8832 | | | |
| | $d_8$ = 1.200 | $n_8$ = 1.74100 | $v_8$ = 52.68 |
| $r_9$ = 39.6186 | | | |
| | $d_9$ = 0.200 | | |
| $r_{10}$ = 22.5832 | | | |
| | $d_{10}$ = 4.000 | $n_{10}$ = 1.74077 | $v_{10}$ = 27.79 |
| $r_{11}$ = −25.9380 | | | |
| | $d_{11}$ = 0.821 | | |
| $r_{12}$ = −20.5061 | | | |
| | $d_{12}$ = 1.100 | $n_{12}$ = 1.77250 | $v_{12}$ = 49.66 |
| $r_{13}$ = −1236.8753 | | | |
| | $d_{13}$ = 21.3690 (low), 10.6785 (moderate), 2.4752 (high) | | |
| $r_{14}$ = 17.4722 (aspherical) | | | |
| | $d_{14}$ = 4.955 | $n_{14}$ = 1.55963 | $v_{14}$ = 61.17 |
| $r_{15}$ = −29.1089 | | | |
| | $d_{15}$ = 1.400 | | |
| $r_{16}$ = −20.1868 | | | |
| | $d_{16}$ = 1.200 | $n_{16}$ = 1.78472 | $v_{16}$ = 25.68 |
| $r_{17}$ = −78.2748 | | | |
| | $d_{17}$ = 7.9972 (low), 6.6835 (moderate), 6.3593 (high) | | |
| $r_{18}$ = −865.7039 (aspherical) | | | |
| | $d_{18}$ = 2.342 | $n_{18}$ = 1.48749 | $v_{18}$ = 70.20 |
| $r_{19}$ = −22.1048 | | | |
| | $d_{19}$ = 40.2630 (low), 50.9140 (moderate), 55.3800 (high) | | |

(Eyepiece system)

| | | | |
|---|---|---|---|
| $r_{20}$ = ∞ | | | |
| | $d_{20}$ = 5.000 | $n_{20}$ = 1.52540 | $v_{20}$ = 56.25 |
| $r_{21}$ = −20.0000 | | | |
| | $d_{21}$ = 40.930 | | |

[Observing optical system]

| | | | |
|---|---|---|---|
| $r_{22}$ = 56.7366 | (aspherical) | | |
| | $d_{22}$ = 5.000 | $n_{22}$ = 1.52540 | $v_{22}$ = 56.25 |
| $r_{23}$ = −43.2364 | | | |
| | $d_{23}$ = 15 | | |
| $r_{24}$ (pupil) | | | |

Aspherical coefficients
Fourteenth surface

P = 2.5687
E = −0.39066 × $10^{-4}$, F = −0.22909 × $10^{-6}$,
G = −0.92040 × $10^{-10}$, H = −0.12108 × $10^{-10}$
Eighteenth surface P = 6.5404
E = −0.50437 × $10^{-4}$, F = −0.12402 × $10^{-6}$,
G = −0.25021 × $10^{-9}$, H = −0.68127 × $10^{-11}$
Twenty-second surface

P = −21.4426
E = 0, F = 0, G = 0, H = 0

Figure 18A:
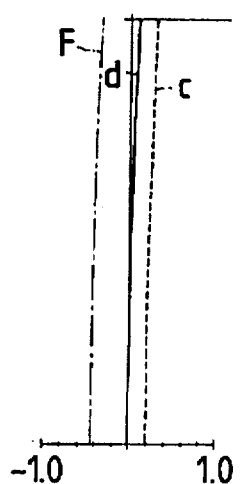
FIGS. 18A, 18B, and 18C are diagrams showing characteristics of spherical aberration, astigmatism, and distortion, respectively, of the eyepiece system of the observing optical system used in the fourth embodiment.
Figure 18B:
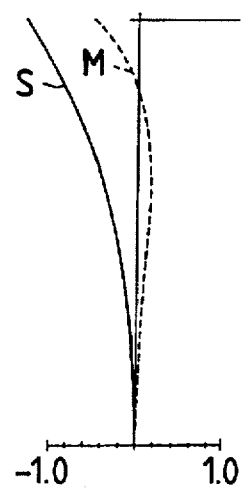
Figure 18C:
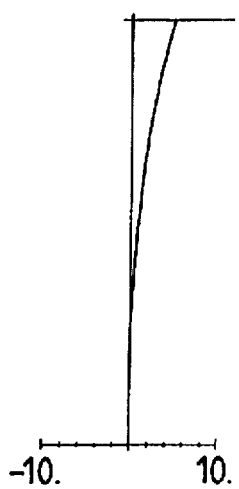

FIGS. 12A–12D, 13A–13D, and 14A–14D are aberration curve diagrams in the photographing optical system of the camera of the fourth embodiment. FIGS. 15A–15D, 16A–16D, and 17A–17D are aberration curve diagrams in the objective system of the observing optical system of the camera of the fourth embodiment. FIGS. 18A–18C are aberration curve diagrams in the eyepiece system of the observing optical system (in which an object distance by reverse ray-tracing is 2 m).

FIFTH EMBODIMENT

The camera of this embodiment is such that the photographing and observing optical systems of the camera disclosed in the second embodiment are constructed with zoom lenses, respectively.

The photographing optical system used in the camera of the fifth embodiment is designed similar to that shown in the fourth embodiment (refer to FIGS. 10A–10C). Thus, the movement of the lens units constituting the photographing optical system is also the same as in the fourth embodiment.

Figure 19A:
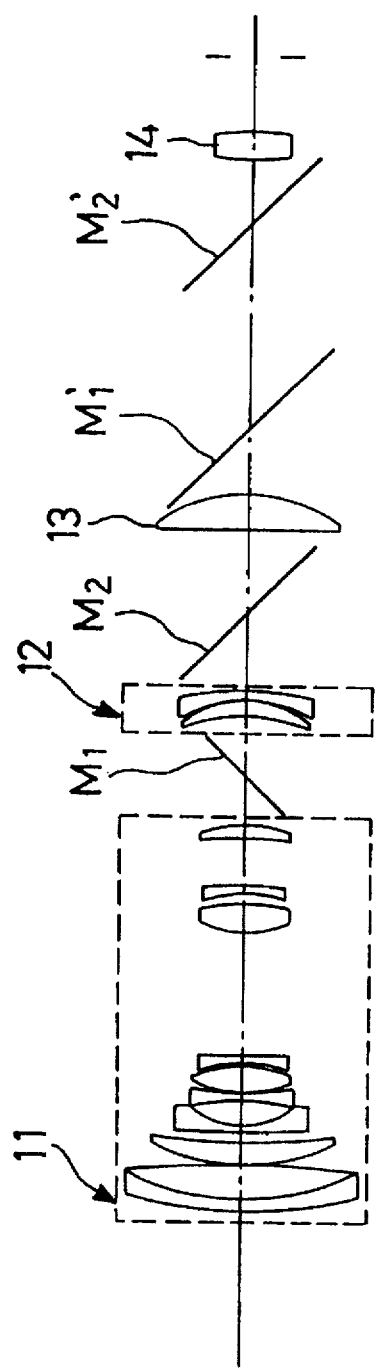
FIGS. 19A, 19B, and 19C are views showing the arrangements, developed along the optical axis, at low, moderate, and high magnification positions, respectively, of an observing optical system used in a fifth embodiment of the camera according to the present invention.
Figure 19B:
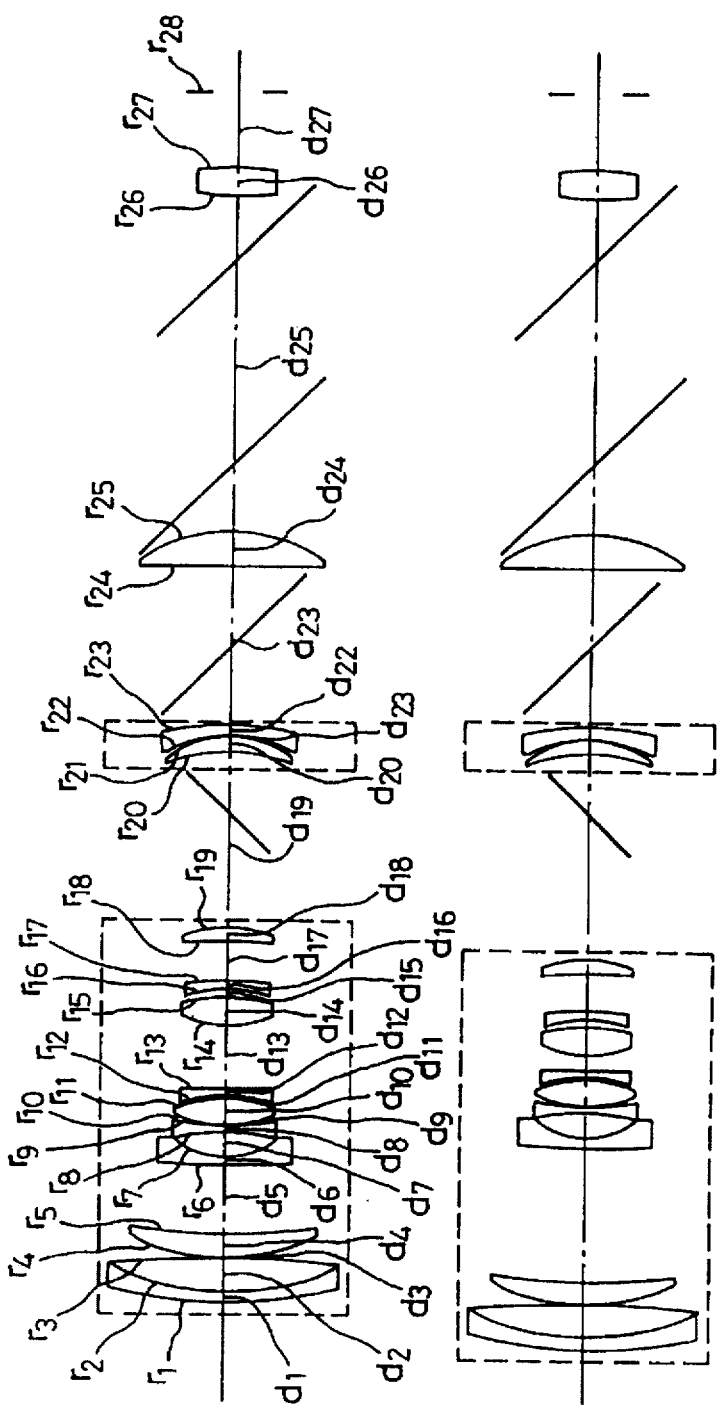
Figure 19C:
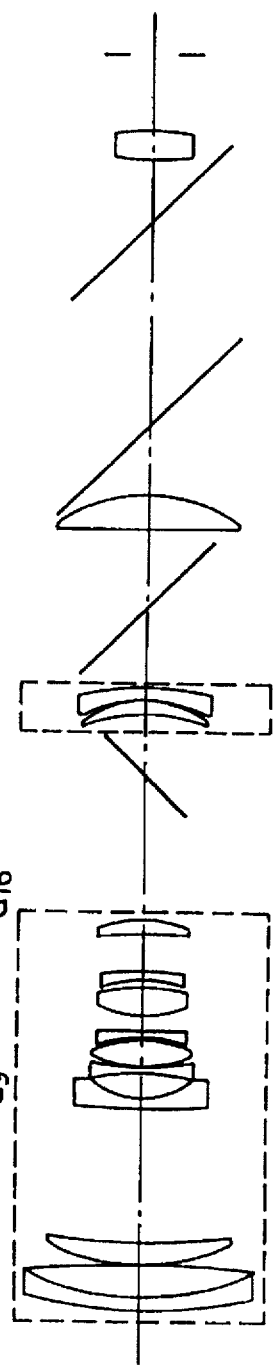

The observing optical system used in the camera of the fifth embodiment, as shown in FIGS. 19A–19C, comprises, in order from the object side, the first lens system 11, the first mirror M1, the second lens system 12, the second mirror M2, the field lens 13, the first mirror M1' for the observing system, the second mirror M2' for the observing system, and the Lupe 14. The first mirror M1, the second lens system 12, the second mirror M2, the field lens 13, the first mirror M1', the second mirror M2', and the Lupe 14 are all fixed during the zooming. The surface of the field lens 13 on which light is incident is covered with a screen mat, on which the object image is formed, so that the object image can be observed through the Lupe 14.

In the fifth embodiment, the photographing and observing optical systems have, for common use, the first lens system 11 composed of the first to fourth lens units G1–G4, the first mirror M1, and the second lens system 12 composed of the fifth lens unit G5. The second mirror M2 can be rotated, thereby changing over the optical path, and optical paths subsequent to the second mirror M2 are formed so that the optical path of the photographing optical system is independent of that of the observing optical system.

The third and fourth lens units G3 and G4 of the first lens system 11, which are particular places where rays of light concentrate, are exceedingly subject to spherical aberration and coma. In the fifth embodiment, these aberrations are corrected in the same way as in the fourth embodiment. Likewise, it is desirable to satisfy Eq. (2).

The numerical data of lenses in the optical system of the fifth embodiment is as follows: Also, since the arrangement of the photographing optical system is the same as in the fourth embodiment, its data is omitted.

[Observing optical system]

(Objective system)

| | | | |
|---|---|---|---|
| $r_1 = 85.4456$ | | | |
| | $d_1 = 1.950$ | $n_1 = 1.80518$ | $v_1 = 25.43$ |
| $r_2 = 43.4196$ | | | |
| | $d_2 = 5.500$ | $n_2 = 1.54771$ | $v_2 = 62.83$ |
| $r_3 = -213.7532$ | | | |
| | $d_3 = 0.100$ | | |
| $r_4 = 31.3075$ | | | |
| | $d_4 = 4.000$ | $n_4 = 1.48749$ | $v_4 = 70.20$ |
| $r_5 = 122.1096$ | | | |
| | $d_5 = 1.4321$ (low), 11.5122 (moderate), 22.4004 (high) | | |
| $r_6 = 175.9715$ | | | |
| | $d_6 = 1.500$ | $n_6 = 1.81600$ | $v_6 = 46.62$ |
| $r_7 = 13.3064$ | | | |
| | $d_7 = 4.200$ | | |
| $r_8 = -41.8832$ | | | |
| | $d_8 = 1.200$ | $n_8 = 1.74100$ | $v_8 = 52.68$ |
| $r_9 = 39.6186$ | | | |
| | $d_9 = 0.200$ | | |
| $r_{10} = 22.5832$ | | | |
| | $d_{10} = 4.000$ | $n_{10} = 1.74077$ | $v_{10} = 27.79$ |
| $r_{11} = -25.9380$ | | | |
| | $d_{11} = 0.821$ | | |
| $r_{12} = -20.5061$ | | | |
| | $d_{12} = 1.100$ | $n_{12} = 1.77250$ | $v_{12} = 49.66$ |
| $r_{13} = -1236.8753$ | | | |
| | $d_{13} = 21.3690$ (low), 10.6785 (moderate), 2.4752 (high) (aspherical) | | |
| $r_{14} = 17.4722$ | | | |
| | $d_{14} = 4.955$ | $n_{14} = 1.55963$ | $v_{14} = 61.17$ |
| $r_{15} = -29.1089$ | | | |
| | $d_{15} = 1.400$ | | |
| $r_{16} = -20.1868$ | | | |
| | $d_{16} = 1.200$ | $n_{16} = 1.78472$ | $v_{16} = 25.68$ |
| $r_{17} = -78.2748$ | | | |
| | $d_{17} = 7.9972$ (low), 6.6835 (moderate) 6.3593 (high) (aspherical) | | |
| $r_{18} = -865.7039$ | | | |
| | $d_{18} = 2.342$ | $n_{18} = 1.48749$ | $v_{18} = 70.20$ |
| $r_{19} = -22.1048$ | | | |
| | $d_{19} = 18.7033$ (low), 29.3543 (moderate), 33.8205 (high) | | |
| $r_{20} = -28.8007$ | | | |
| | $d_{20} = 2.700$ | $n_{20} = 1.53172$ | $v_{20} = 48.90$ |
| $r_{21} = -16.6629$ | | | |
| | $d_{21} = 0.299$ | | |
| $r_{22} = -18.3409$ | | | |
| | $d_{22} = 1.499$ | $n_{22} = 1.80400$ | $v_{22} = 46.57$ |
| $r_{23} = -44.2389$ | | | |
| | $d_{23} = 26.992$ | | |

(Eyepiece system)

| | | | |
|---|---|---|---|
| $r_{24} = \infty$ | | | |
| | $d_{24} = 6.000$ | $n_{24} = 1.52540$ | $v_{24} = 56.25$ |
| $r_{25} = -25.0000$ | | | |
| | $d_{25} = 56.999$ (aspherical) | | |
| $r_{26} = 81.7042$ | | | |
| | $d_{26} = 5.000$ | $n_{26} = 1.52540$ | $v_{26} = 56.25$ |
| $r_{27} = -57.9134$ | | | |
| | $d_{27} = 15$ | | |

[Observing optical system]

$r_{28}$ (pupil)

Aspherical coefficients
Fourteenth surface

P = 2.5687
E = $-0.39066 \times 10^{-4}$, F = $-0.22909 \times 10^{-6}$,
G = $-0.92040 \times 10^{-10}$, H = $-0.12108 \times 10^{-10}$
Eighteenth surface P = 6.5404
E = $-0.50437 \times 10^{-4}$, F = $-0.12402 \times 10^{-6}$,
G = $-0.25021 \times 10^{-9}$, H = $-0.68127 \times 10^{-11}$
Twenty-sixth surface

P = −32.9042
E = 0, F = 0, G = 0, H = 0

Figure 20A:
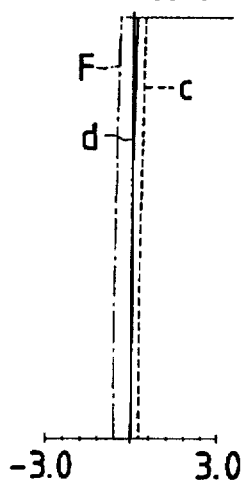
FIGS. 20A, 20B, and 20C are diagrams showing characteristics of spherical aberration, astigmatism, and distortion, respectively, of the eyepiece system of the observing optical system used in the fifth embodiment.
Figure 20B:
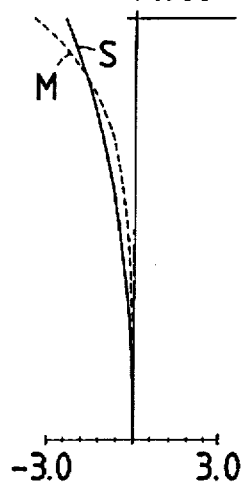
Figure 20C:
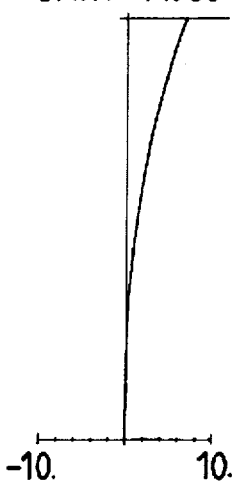

FIGS. 20A–20C are aberration curve diagrams in the eyepiece system of the observing optical system used in the camera of the fifth embodiment (in which the object distance by reverse ray-tracing is 2 m). The aberration curve diagrams in the objective system of the observing optical system are omitted since they are the same as FIGS. 15A–15D, 16A–16D, and 17A–17D.

SIXTH EMBODIMENT

The camera of this embodiment is such that the photographing and observing optical systems of the camera disclosed in the third embodiment are constructed with zoom lenses, respectively.

Figure 21A:
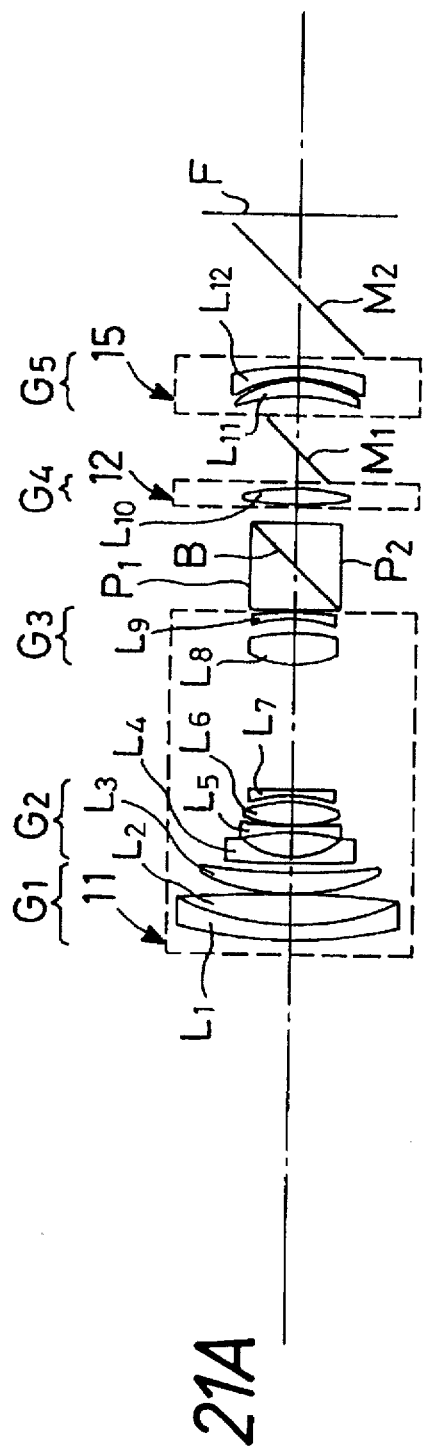
FIGS. 21A, 21B, and 21C are views showing the arrangements, developed along the optical axis, at low, moderate, and high magnification positions, respectively, of a photographing optical system used in a sixth embodiment of the camera according to the present invention.
Figure 21B:
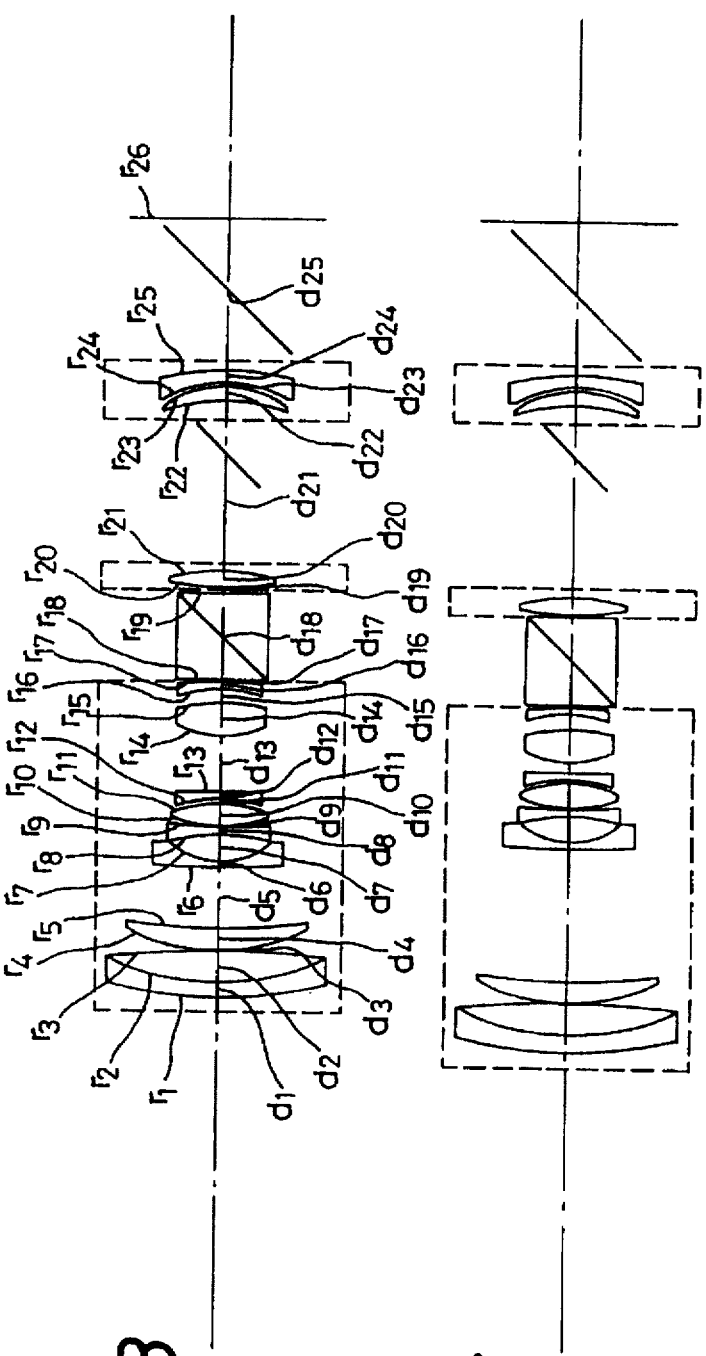
Figure 21C:

In the photographing optical system used in the camera of the sixth embodiment, as shown in FIGS. 21A–21C, the first lens system 11 includes, in order from the object side, the first lens unit G1, the second lens unit G2, and the third lens unit G3. The second lens system 12 is constructed with the fourth lens unit G4 alone, and a third lens system 15 with the fifth lens unit G5. The first lens unit G1 is composed of a cemented lens component with a negative lens L1 and a positive lens L2, and a positive lens L3, which have a positive refracting power as a whole. The second lens unit G2 is composed of a negative lens L4, a negative lens L5, a positive lens L6, and a negative lens L7, which have a negative refracting power as a whole. The third lens unit G3 is composed of a positive lens L5 and a negative lens L9, which have a positive refracting power as a whole. The fourth lens unit G4 consists of a single positive lens L10. Finally, the fifth lens unit G5 consists of a positive lens L11 and a negative lens L12, which have a negative refracting power as a whole.

When the magnification of the optical system is changed from the low magnification position to the high magnification position, the first, third, and fourth lens units G1, G3, and G4 are moved toward the object (the left of the figures), and the second lens unit G2 is moved toward the image (the right). In this case, the first to fourth lens units G1–G4 are moved independent of one another. The fifth lens unit G5 is fixed.

Between the first and second lens systems 11 and 12, prisms P1 and P2 are arranged which are cemented at an angle of about 45° so that a coating is applied to their interface and the beam splitter B is configured.

In the sixth embodiment, this beam splitter B transmits at least 50% of the amount of light and reflects the remainder to split the optical path. The transmitted light is introduced into the optical path of the photographing optical system.

and the reflected light into the optical path of the observing optical system described later.

The first mirror M1 is disposed behind the second lens system 12, and the second mirror M2 behind the third lens system 15. Thus, the photographing optical system of the sixth embodiment, as in the third embodiment, includes, in order from the object side, the first lens system 11, the beam splitter B, the second lens system 12, the first mirror M1, the third lens system 15, the second mirror M2, and the film surface F. The first and second mirrors M1 and M2 remain fixed during the zooming of the photographing optical system.

Figures 22A, 22B, 22C:
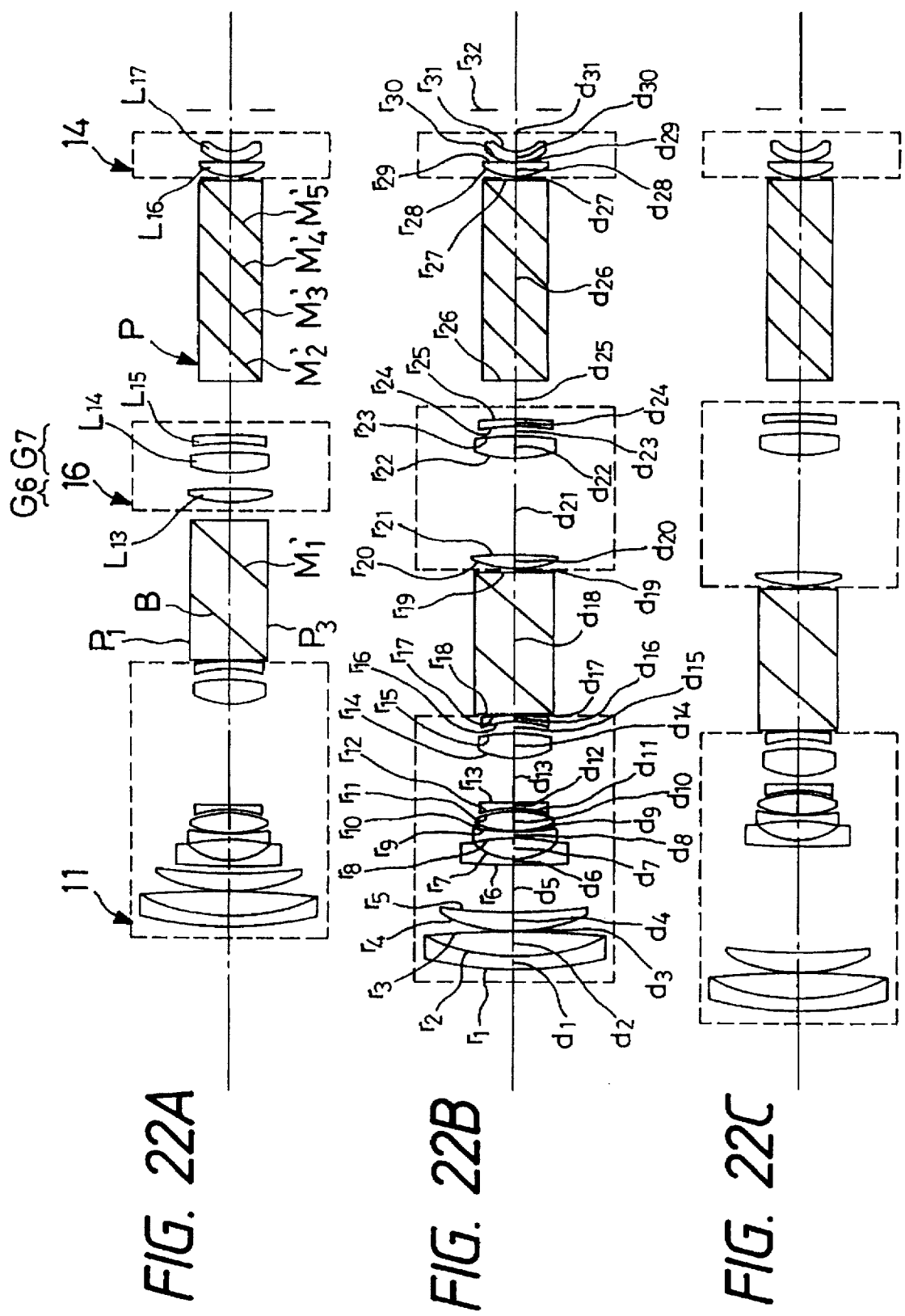
FIGS. 22A, 22B, and 22C are views showing the arrangements, developed along the optical axis, at low, moderate, and high magnification positions, respectively, of an observing optical system used in the sixth embodiment.
Figure 23A:
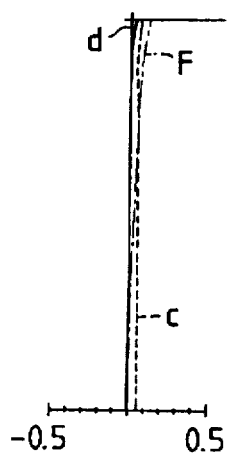
FIGS. 23A, 23B, 23C, and 23D are diagrams showing characteristics of spherical aberration, astigmatism, chromatic aberration of magnification, and distortion, respectively, at the low magnification position of the photographing optical system of FIG. 21A.
Figure 23B:
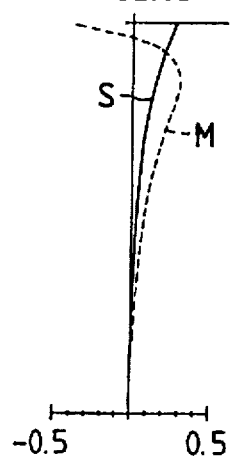
Figure 23C:
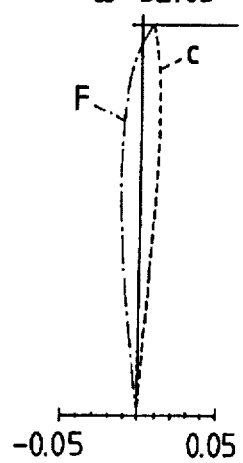
Figure 23D:
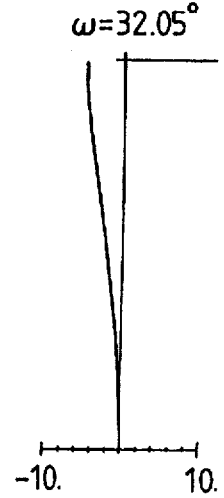
Figure 24A:
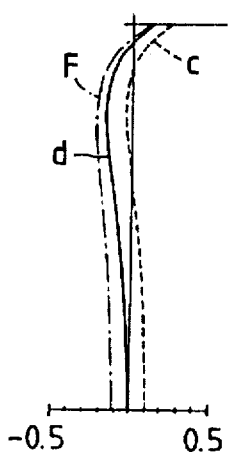
FIGS. 24A, 24B, 24C, and 24D are diagrams showing characteristics of spherical aberration, astigmatism, chromatic aberration of magnification, and distortion, respectively, at the moderate magnification position of the photographing optical system of FIG. 21B.
Figure 24B:
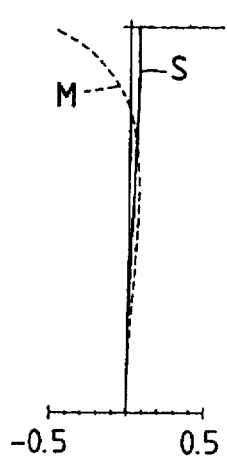
Figure 24C:
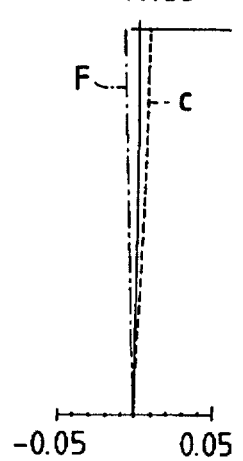
Figure 24D:
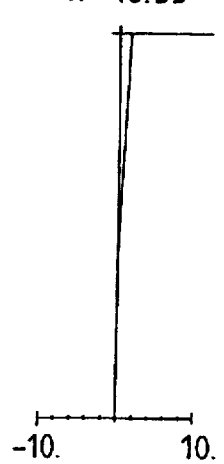
Figure 27A:
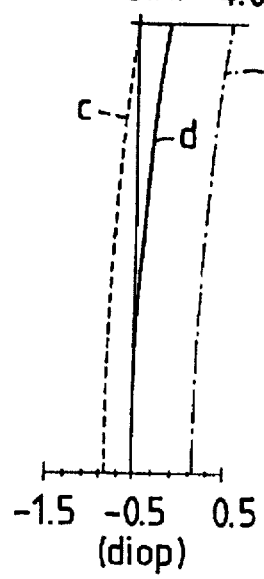
FIGS. 27A, 27B, and 27C are diagrams showing characteristics of spherical aberration, astigmatism, and distortion, respectively, at the moderate magnification position of the objective system of the observing optical system of FIG. 22B.
Figure 27B:
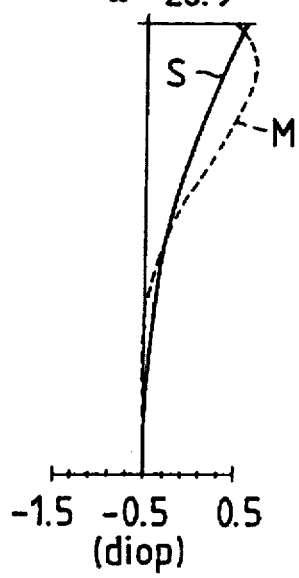
Figure 27C:
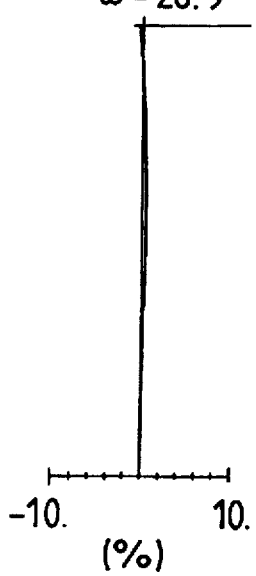
Figure 28A:
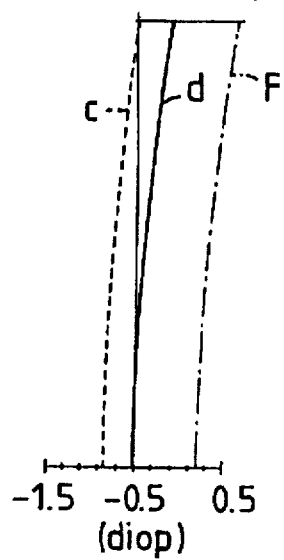
FIGS. 28A, 28B, and 28C are diagrams showing characteristics of spherical aberration, astigmatism, and distortion, respectively, at the high magnification position of the objective system of the observing optical system of FIG. 22C.
Figure 28B:
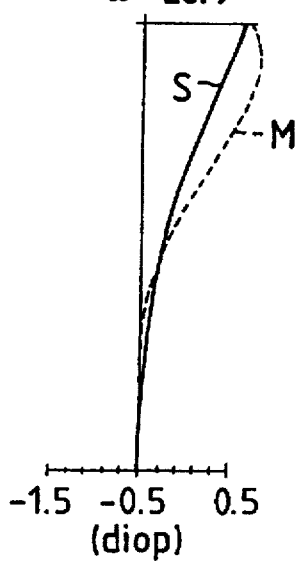
Figure 28C:
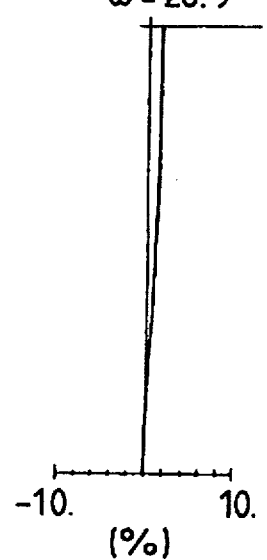

On the other hand, the observing optical system, as shown in FIGS. 22A–22C, includes, in order from the object side, the first lens system 11 consisting of the first to third lens units G1–G3 also used in the photographing optical system, the prism P1, a prism P3, a second lens system 16 for the observing system, the prism P, and the Lupe 14. The prisms P1 and P3, as in the photographing optical system, are cemented to configure a beam splitter, and additionally the prism P3 is provided with the first mirror M1' for the observing system.

The second lens system 16 is constructed with a sixth lens unit G6 composed of a positive lens L13 and a seventh lens unit G7 of a positive lens L14 and a negative lens L15. When the magnification of the observing optical system is changed from the low magnification position to the high magnification position, the sixth lens unit G6 is moved toward the object (the left of the figures), and the seventh lens unit G7, including two lenses as a unit, is moved toward the image (the right). BY the movement of the sixth and seventh lens units G6 and G7, the variable magnification ratio between the low magnification position and the high magnification position of the observing optical system is maintained practically identical with that of the photographing optical system. Moreover, the object image which is smaller than that of the photographing optical system can be formed adjacent to the incident surface of the prism P.

The prism P is provided with the second mirror M2', the third mirror M3', the fourth mirror M4', and the fifth mirror M5' for the observing system, and is configured as a Porro prism. The Lupe 14 is constructed with a positive lens L16 and a negative lens L17 so that their combined refracting power becomes positive.

As mentioned above, the observing optical system used in the camera of the sixth embodiment includes the first lens system 11, the prism P1, the prism P3, and the second lens system 16 as the objective system, and the prism P and the Lupe 14 as the eyepiece system, so that a real image mode finder is constructed. Also, the first lens system 11 and the prism P1 are used in both the photographing and observing optical systems.

The third lens unit G3 of the first lens system 11 and the fourth lens unit G4, which are particular places where rays of light concentrate, are exceedingly subject to spherical aberration and coma. In the sixth embodiment, these aberrations are corrected in the same way as in the fourth embodiment. Likewise, it is desirable to satisfy Eq. (2).

The size of the intermediate image of the observing optical system is set to be smaller than that of the photographing optical system, and hence the observing optical system can be made small, with a resultant compact design of the camera.

In the sixth embodiment, when the field factor of the finder is set to 85%, the size of the intermediate image is nearly 0.35 times that of the film. Also, although the optical path is split by the beam splitter toward the photographing and observing optical systems, a movable mirror may be used to switch over the optical path. In this case, the size of the mirror need not cover the effective diameter of the photographing optical system, and if it covers the effective diameter of the observing optical system, the object of the present invention will be attained.

The following is the numerical data of lenses in the optical system of the sixth embodiment.

| [Photographing optical system] | | | |
|---|---|---|---|
| Focal Length = | 28.8 (low magnification position), 57.9 (moderate magnification position), 116.3 (high magnification position) | | |
| Field angle (2ω) = | 64.1° (low), 32.7° (moderate), 16.3° (high) | | |
| F-number = 4.8 (low), 5.3 (moderate), 5.8 (high) | | | |
| $r_1 = 93.9459$ | | | |
| | $d_1 = 1.950$ | $n_1 = 1.80518$ | $\nu_1 = 25.43$ |
| $r_2 = 46.7727$ | | | |
| | $d_2 = 5.500$ | $n_2 = 1.54771$ | $\nu_2 = 62.83$ |
| $r_3 = -187.0984$ | | | |
| | $d_3 = 0.100$ | | |
| $r_4 = 31.6516$ | | | |
| | $d_4 = 4.000$ | $n_4 = 1.48749$ | $\nu_4 = 70.20$ |
| $r_5 = 111.8270$ | | | |
| | $d_5 = 1.1108$ (low), 10.4363 (moderate), 22.9108 (high) | | |
| $r_6 = 140.3216$ | | | |
| | $d_6 = 1.500$ | $n_5 = 1.81600$ | $\nu_6 = 46.62$ |
| $r_7 = 13.7791$ | | | |
| | $d_7 = 4.200$ | | |
| $r_8 = -31.1370$ | | | |
| | $d_8 = 1.200$ | $n_8 = 1.74100$ | $\nu_8 = 52.68$ |
| $r_9 = 74.0456$ | | | |
| | $d_9 = 0.200$ | | |
| $r_{10} = 26.6144$ | | | |
| | $d_{10} = 4.000$ | $n_{10} = 1.74077$ | $\nu_{10} = 27.79$ |
| $r_{11} = -23.8562$ | | | |
| | $d_{11} = 1.050$ | | |
| $r_{12} = -19.4355$ | | | |
| | $d_{12} = 1.100$ | $n_{12} = 1.77250$ | $\nu_{12} = 49.66$ |
| $r_{13} = 1861.7989$ | | | |
| | $d_{13} = 20.9550$ (low), 9.3689 (moderate), 1.9822 (high) (aspherical) | | |
| $r_{14} = 19.7020$ | | | |
| | $d_{14} = 5.616$ | $n_{14} = 1.58913$ | $\nu_{14} = 61.18$ |
| $r_{15} = -24.8156$ | | | |
| | $d_{15} = 2.127$ | | |
| $r_{16} = -20.0077$ | | | |
| | $d_{16} = 1.200$ | $n_{16} = 1.80518$ | $\nu_{16} = 25.43$ |
| $r_{17} = -85.9798$ | | | |
| | $d_{17} = 0.300$ | | |
| $r_{18} = \infty$ | | | |
| | $d_{18} = 15.000$ | $n_{18} = 1.51633$ | $\nu_{18} = 64.15$ |
| $r_{19} = \infty$ | | | |
| | $d_{19} = 3.6130$ (low), 1.1889 (moderate), 0.5695 (high) (aspherical) | | |
| $r_{20} = 58.6304$ | | | |
| | $d_{20} = 2.661$ | $n_{20} = 1.48749$ | $\nu_{20} = 70.20$ |
| $r_{21} = -35.0730$ | | | |
| | $d_{21} = 15.2963$ (low), 28.7843 (moderate), 32.5697 (high) | | |
| $r_{22} = -32.7121$ | | | |
| | $d_{22} = 3.000$ | $n_{22} = 1.54814$ | $\nu_{22} = 45.78$ |
| $r_{23} = -17.4895$ | | | |
| | $d_{23} = 0.774$ | | |
| $r_{24} = -18.7405$ | | | |
| | $d_{24} = 1.499$ | $n_{24} = 1.81600$ | $\nu_{24} = 46.62$ |
| $r_{25} = -51.1808$ | | | |

-continued

[Photographing optical system]

$d_{25} = 26.7380$
$r_{26}$ (film surface)

Aspherical coefficients

Fourteenth surface

P = 2.6177
E = −0.37456 × 10⁻⁴,   F = −0.15014 × 10⁻⁶,
G = 0.15456 × 10⁻⁹,   H = −0.11587 × 10⁻¹⁰

Twentieth surface

P = 6.5402
E = −0.31824 × 10⁻⁴,   F = −0.13337 × 10⁻⁸,
G = −0.92158 × 10⁻⁹,   H = −0.47833 × 10⁻¹¹

In the photographing optical system of the sixth embodiment, the result of Eq. (2) is as follows:

[Observing optical system]

(Objective system)

| | | | |
|---|---|---|---|
| $r_1 = 93.9459$ | | | |
| | $d_1 = 1.950$ | $n_1 = 1.80518$ | $v_1 = 25.43$ |
| $r_2 = 46.7727$ | | | |
| | $d_2 = 5.500$ | $n_2 = 1.54771$ | $v_2 = 62.83$ |
| $r_3 = -187.0984$ | | | |
| | $d_3 = 0.100$ | | |
| $r_4 = 31.6516$ | | | |
| | $d_4 = 4.000$ | $n_4 = 1.48749$ | $v_4 = 70.20$ |
| $r_5 = 111.8270$ | | | |
| | $d_5 = 1.1108$ (low), 10.4363 (moderate), 22.9108 (high) | | |
| $r_6 = 140.3216$ | | | |
| | $d_6 = 1.500$ | $n_5 = 1.81600$ | $v_6 = 46.62$ |
| $r_7 = 13.7791$ | | | |
| | $d_7 = 4.200$ | | |
| $r_8 = -31.1370$ | | | |
| | $d_8 = 1.200$ | $n_8 = 1.74100$ | $v_8 = 52.68$ |
| $r_9 = 74.0456$ | | | |
| | $d_9 = 0.200$ | | |
| $r_{10} = 26.6144$ | | | |
| | $d_{10} = 4.000$ | $n_{10} = 1.74077$ | $v_{10} = 27.79$ |
| $r_{11} = -23.8562$ | | | |
| | $d_{11} = 1.050$ | | |
| $r_{12} = -19.4355$ | | | |
| | $d_{12} = 1.100$ | $n_{12} = 1.77250$ | $v_{12} = 49.66$ |
| $r_{13} = 1861.7989$ | | | |
| | $d_{13} = 20.9550$ (low), 9.3689 (moderate), 1.9822 (high) | | |
| $r_{14} = 19.7020$ (aspherical) | | | |
| | $d_{14} = 5.616$ | $n_{14} = 1.58913$ | $v_{14} = 61.18$ |
| $r_{15} = -24.8156$ | | | |
| | $d_{15} = 2.127$ | | |
| $r_{16} = -20.0077$ | | | |
| | $d_{16} = 1.200$ | $n_{16} = 1.80518$ | $v_{16} = 25.43$ |
| $r_{17} = -85.9798$ | | | |
| | $d_{17} = 0.300$ | | |
| $r_{18} = \infty$ | | | |
| | $d_{18} = 30.000$ | $n_{18} = 1.51633$ | $v_{18} = 64.15$ |
| $r_{19} = \infty$ | | | |
| | $d_{19} = 3.8878$ (low), 0.8964 (moderate), 0.6857 (high) | | |
| $r_{20} = 25.6100$ (aspherical) | | | |
| | $d_{20} = 2.661$ | $n_{20} = 1.52540$ | $v_{20} = 56.25$ |
| $r_{21} = -90.6089$ | | | |
| | $d_{21} = 3.1074$ (low), 20.7291 (moderate), 25.1816 (high) | | |
| $r_{22} = 31.2583$ | | | |
| | $d_{22} = 4.500$ | $n_{22} = 1.52540$ | $v_{22} = 56.25$ |

[Observing optical system]

| | | | |
|---|---|---|---|
| $r_{23} = -48.2105$ | | | |
| | $d_{23} = 2.500$ | | |
| $r_{24} = -36.9005$ | | | |
| | $d_{24} = 1.500$ | $n_{24} = 1.58423$ | $v_{24} = 3.49$ |
| $r_{25} = -73.6537$ | (aspherical) | | |
| | $d_{25} = 11.5968$ (low), 8.0301 (moderate), 6.9546 (high) | | |

(Eyepiece system)

| | | | |
|---|---|---|---|
| $r_{26} = \infty$ | | | |
| | $d_{26} = 43.000$ | $n_{26} = 1.52540$ | $v_{26} = 56.25$ |
| $r_{27} = \infty$ | | | |
| | $d_{27} = 0.722$ | | |
| $r_{28} = 11.5482$ | | | |
| | $d_{28} = 3.000$ | $n_{28} = 1.52540$ | $v_{28} = 56.25$ |
| $r_{29} = 473.4798$ | | | |
| | $d_{29} = 0.200$ | | |
| $r_{30} = 9.1612$ | (aspherical) | | |
| | $d_{30} = 2.000$ | $n_{30} = 1.52540$ | $v_{30} = 56.25$ |
| $r_{31} = 7.0575$ | | | |
| | $d_{31} = 13.5$ | | |
| $r_{32} = $ (pupil) | | | |

Aspherical coefficients

Fourteenth surface

P = 2.6177
E = −0.37456 × 10⁻⁴,   F = −0.15014 × 10⁻⁶,
G = 0.15456 × 10⁻⁹,   H = −0.11587 × 10⁻¹⁰

Twentieth surface

P = 4.0000
E = −0.39070 × 10⁻⁴,   F = 0.18392 × 10⁻⁷,
G = −0.45943 × 10⁻⁸,   H = 0.39774 × 10⁻¹⁰

Twenty-fifth surface

P = 1.0000
E = 0.41755 × 10⁻⁴,   F = −0.10121 × 10⁻⁵,
G = −0.15957 × 10⁻¹⁰,   H = 0.86447 × 10⁻¹⁰

Thirtieth surface

P = 1.0000
E = −0.70004 × 10⁻⁴,   F = 0.10355 × 10⁻⁶,
G = −0.44459 × 10⁻⁷,   H = 0

FIGS. 23A–23D, 24A–24D, and 25A–25D are aberration curve diagrams in the photographing optical system of the camera of the sixth embodiment. FIGS. 26A–26C, 27A–27C, and 28A–28C are aberration curve diagrams of the objective system in the observing optical system of the camera of the sixth embodiment.

In each embodiment mentioned above, $r_1, r_2, \ldots$ represent radii of curvature of individual lens surfaces; $d_1, d_2, \ldots$ thicknesses of individual lenses or spaces therebetween; $n_1, n_2, \ldots$ refractive indices of individual lenses; $v_1, v_2, \ldots$ Abbe's numbers of individual lenses; P the conic constant; and E, F, G, and H the aspherical coefficients.

Also, the configurations of aspherical surfaces in each embodiment are expressed by the following equation using the aspherical coefficients:

$$X = (Y^2/r)/[1+\{1-P(Y/r^2)\}^{1/2}] + EY^4 + FY^6 + GY^8 + HY^{10}$$

where X is the coordinates in the direction of the optical axis, and Y is the coordinates in the direction normal to the optical axis.

What is claimed is:

1. A camera having a short entire length, comprising:
   a photographing optical system having a plurality of lenses for forming an image of an object on a film surface arranged thereafter; and an observing optical system of real image type for observing the image via a branch of an optical path split at a position inside or after said photographing optical system, wherein said camera further comprises a plurality of reflecting members including a first reflecting member interposed in said photographing optical system and a second reflecting member which is an exclusive member interposed between a most image-side lens of said photographing optical system and said film surface, one of said first and second reflecting members having a movable or beam splitting surface for allowing a beam traveling in said photographing optical system to emerge therefrom to be introduced into said observing optical system, another of said first and second reflecting members being arranged for bending said beam traveling in said photographing optical system.

2. A camera according to claim 1, wherein said optical path is caused to bend to lead to said film surface by a pair of path folding members included in said plurality of reflecting members, one of said pair of path folding members being said reflecting member arranged for bending said beam.

3. A camera according to claim 2, wherein another of said pair of path folding members is said reflecting member having said movable or beam splitting surface.

4. A camera according to claim 3, wherein said first reflecting member has said movable or beam splitting surface for allowing said beam traveling in said photographing optical system to emerge therefrom to be introduced into said observing optical system.

5. A camera according to claim 3, wherein said second reflecting member has said movable or beam splitting surface for allowing said beam traveling in said photographing optical system to emerge therefrom to be introduced into said observing optical system.

6. A camera having a short entire length, comprising:

a photographing optical system having a plurality of lenses for forming an image of an object on a film surface arranged thereafter; and an observing optical system of real image type for observing the image via a branch of an optical path split at a position inside or after said photographing optical system;

wherein said camera further comprises a plurality of reflecting members including a first reflecting member interposed in said photographing optical system and a second reflecting member interposed between a most image-side lens of said photographing optical system and said film surface, said first reflecting member having a movable or beam splitting surface for allowing a beam traveling in said photographing optical system to emerge therefrom to be introduced into said observing optical system, said second reflecting member being arranged for bending said beam traveling in said photographing optical system.

7. A camera according to claim 6, wherein said optical path is caused to bend to lead to said film surface by a pair of path folding members included in said plurality of reflecting members, one of said pair of path folding members being said second reflecting member.

8. A camera according to claim 7, wherein another of said pair of path folding members is said first reflecting member.

9. A camera according to claims 3, 8, 4 or 5, wherein said optical path is split for said photographing optical system and said observing optical system by rotation of said reflecting member having said movable or beam splitting surface.

10. A camera according to claim 6, wherein said first reflecting member leaves said optical path running straight and causes the same to bend.

11. A camera according to claim 1 or 6, wherein said reflecting member having said movable or beam splitting surface causes said optical path to bend in mutually opposite directions.

12. A camera according to claims 2 or 7, wherein said photographing optical system is constructed as a zoom photographing optical system including, in order from an object side, a first lens unit with positive refracting power, a second lens unit with negative refracting power, a third lens unit with positive refracting power, a fourth lens unit with positive refracting power, and a fifth lens unit with negative refracting power.

13. A camera according to claim 12, wherein a lens configuration combining said third lens unit and said fourth lens unit of said photographing optical system includes, in order from said object side, a positive lens, a negative lens, and a positive lens.

14. A camera according to claim 12, satisfying a condition:

$$0.1 < f34/(FNO \times D34) < 0.8$$

where f34 is a combined focal length of said third lens unit and said fourth lens unit constituting said photographing optical system, FNO is an F-number at a low magnification position of said photographing optical system, and D34 is a combined optical length of said third lens unit and said fourth lens unit.

15. A camera according to claim 12, wherein said pair of path folding members are arranged with one member of said pair before and one member of said pair behind said fifth lens unit constituting said photographing optical system.

16. A camera according to claim 15, wherein said pair of path folding members cause said optical path to bend to lead to a film surface, wherein said film surface substantially faces an object.

17. A camera according to claim 12, wherein a magnification of said photographing optical system is changed from a low magnification position to a high magnification position by moving said first lens unit, said third lens unit, and said fourth lens unit toward said object side, said second lens unit toward an image side, and said fifth lens unit is kept fixed, so that spaces between individual lens units are changed.

18. A camera according to claim 12, wherein said pair of path folding members are fixed during a zooming of said photographing optical system.

19. A camera according to claim 12, wherein said first reflecting member has said movable or beam splitting surface for allowing said beam traveling in said photographing optical system to emerge therefrom to be introduced into said observing optical system and is interposed between lens units of said photographing optical system at a position after said second lens unit, and at third reflecting member is interposed in said photographing optical system at a position after said first reflecting member, said third and second reflecting members being said pair of path folding members for causing said optical path to bend to lead to said film surface.

20. A camera according to claim 19, wherein said first reflecting member is configured as a beam splitter.

21. A camera according to claim 20, wherein said beam splitter transmits at least 50% of an amount of incident light and reflects a remainder.

22. A camera according to claim 20, wherein said beam splitter is constructed with two prisms cemented to each other.

23. A camera according to claim 20, wherein said first reflecting member is disposed in said optical path between said third lens unit and said fourth lens unit.

24. A camera according to claims 2 or 7, wherein said photographing optical system is constructed with a zoom lens.

25. A camera according to claim 24, wherein a lens unit fixed during a zooming of said photographing optical system is interposed between said pair of path folding members.

26. A camera according to claim 25, wherein said first reflecting member has said movable or beam splitting surface for allowing said beam traveling in said photographing optical system to emerge therefrom to be introduced into said observing optical system, and a third reflecting member is interposed in said photographing optical system at a position after said first reflecting member, said third and second reflecting members being said pair of path folding members for causing said optical path to bend to lead to said film surface.

* * * * *